United States Patent
Zhang et al.

(10) Patent No.: US 11,563,525 B2
(45) Date of Patent: Jan. 24, 2023

(54) WIFI MULTI-BAND COMMUNICATION

(71) Applicant: Marvell Asia Pte, Ltd., Singapore (SG)

(72) Inventors: Hongyuan Zhang, Fremont, CA (US); Liwen Chu, San Ramon, CA (US)

(73) Assignee: Marvell Asia Pte Ltd, Singapore (SG)

( * ) Notice: Subject to any disclaimer, the term of this patent is extended or adjusted under 35 U.S.C. 154(b) by 118 days.

(21) Appl. No.: 17/214,430

(22) Filed: Mar. 26, 2021

(65) Prior Publication Data

US 2021/0219315 A1 Jul. 15, 2021

Related U.S. Application Data

(63) Continuation of application No. 16/339,517, filed on Apr. 30, 2019, now Pat. No. 10,966,227.
(Continued)

(51) Int. Cl.
*H04L 1/16* (2006.01)
*H04W 72/04* (2009.01)
(Continued)

(52) U.S. Cl.
CPC ....... *H04L 1/1685* (2013.01); *H04W 72/0453* (2013.01); *H04W 72/1263* (2013.01);
(Continued)

(58) Field of Classification Search
None
See application file for complete search history.

(56) References Cited

U.S. PATENT DOCUMENTS 8,773,969 B1  7/2014  Zhang et al.
8,787,385 B2  7/2014  Liu et al.
(Continued)

FOREIGN PATENT DOCUMENTS

EP  2028809 A2  2/2009
EP  2999252 A1  3/2016
(Continued)

OTHER PUBLICATIONS

Fischer et al., "IEEE P802.11—Wireless LANs—Disallowed Subchannels," doc. No. IEEE 802.11-18/0496r3, *The Institute of Electrical and Electronics Engineers*, pp. 1-11 (May 2018).
(Continued)

*Primary Examiner* — Anh Ngoc M Nguyen

(57) ABSTRACT

An AP transmits a multi-user first downlink transmission to a plurality of client stations via a first WLAN communication channel having a first RF bandwidth. The AP generates a MAC data unit having a trigger frame configured to prompt an uplink multi-user transmission by the plurality of client stations, and transmits a second downlink transmission to the plurality of client stations via a second WLAN communication channel having a second RF bandwidth. The second downlink transmission includes the MAC data unit. The AP receives the uplink multi-user transmission from the plurality of client stations via the second WLAN communication channel, the uplink multi-user transmission including simultaneous transmissions from the plurality of client stations within the second WLAN communication channel that overlap in time with the multi-user first downlink transmission via the first WLAN communication channel.

23 Claims, 11 Drawing Sheets

Related U.S. Application Data

(60) Provisional application No. 62/791,519, filed on Jan. 11, 2019.

(51) Int. Cl.
   *H04W 72/12* (2009.01)
   *H04B 7/0452* (2017.01)
   *H04L 5/00* (2006.01)
   *H04W 84/12* (2009.01)
   *H04L 27/26* (2006.01)

(52) U.S. Cl.
   CPC .......... *H04B 7/0452* (2013.01); *H04L 5/0007* (2013.01); *H04L 27/2602* (2013.01); *H04L 27/2603* (2021.01); *H04W 84/12* (2013.01)

(56) References Cited

U.S. PATENT DOCUMENTS

| | | | |
|---|---|---|---|
| 10,257,806 | B2 | 4/2019 | Chu et al. |
| 10,349,413 | B2 | 7/2019 | Zhang et al. |
| 10,966,227 | B2 | 3/2021 | Zhang et al. |
| 2004/0264561 | A1 | 12/2004 | Alexander |
| 2011/0249659 | A1 | 10/2011 | Fontaine et al. |
| 2015/0098541 | A1 | 4/2015 | Ben-Bassat |
| 2016/0212748 | A1 | 7/2016 | Yang et al. |
| 2016/0241315 | A1 | 8/2016 | Kwon |
| 2016/0360443 | A1* | 12/2016 | Hedayat .............. H04W 74/006 |
| 2017/0149547 | A1 | 5/2017 | Kim et al. |
| 2017/0181136 | A1 | 6/2017 | Bharadwaj et al. |
| 2017/0289933 | A1 | 10/2017 | Segev |
| 2017/0295571 | A1 | 10/2017 | Chu et al. |
| 2017/0311204 | A1 | 10/2017 | Cariou et al. |
| 2017/0325178 | A1 | 11/2017 | Verma et al. |
| 2017/0366329 | A1 | 12/2017 | Cao et al. |
| 2018/0077735 | A1 | 3/2018 | Ahn et al. |
| 2018/0115403 | A1* | 4/2018 | Sakai .................... H04L 1/1685 |
| 2018/0160429 | A1 | 6/2018 | Seok |
| 2018/0302858 | A1 | 10/2018 | Son et al. |
| 2019/0123863 | A1 | 4/2019 | Zhang et al. |
| 2019/0174410 | A1 | 6/2019 | Seok et al. |
| 2019/0182714 | A1 | 6/2019 | Chu et al. |
| 2019/0182863 | A1 | 6/2019 | Chu et al. |
| 2019/0190752 | A1 | 6/2019 | Chen |
| 2019/0349930 | A1 | 11/2019 | Chu et al. |
| 2020/0145145 | A1* | 5/2020 | Chu ...................... H04L 1/1621 |
| 2020/0229214 | A1 | 7/2020 | Zhang et al. |

FOREIGN PATENT DOCUMENTS

| | | |
|---|---|---|
| EP | 3051870 A1 | 8/2016 |
| GB | 2501898 A | 11/2013 |
| WO | WO-2006/000955 A1 | 1/2006 |
| WO | WO-2012/026779 A2 | 3/2012 |
| WO | WO-2015/099803 A1 | 7/2015 |
| WO | WO-2017/026937 A1 | 2/2017 |
| WO | WO-2017/111567 A2 | 6/2017 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

International Search Report and Written Opinion in International Patent Application No. PCT/US2019/029984, dated Oct. 1, 2019 (12 pages).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

\* cited by examiner

WIFI MULTI-BAND COMMUNICATION

CROSS REFERENCES TO RELATED APPLICATIONS

This application is a continuation of U.S. patent application Ser. No. 16/399,517 (now U.S. Pat. No. 10,966,227), entitled "WiFi Multi-Band Communication," filed Apr. 30, 2019, which claims the benefit of U.S. Provisional Patent Application No. 62/791,519, entitled "Frequency Division Duplex (FDD) Over Channel Aggregation" filed on Jan. 11, 2019. Both applications identified above are hereby incorporated herein by reference in their entireties.

This application is related to U.S. patent application Ser. No. 16/162,113 (now U.S. Pat. No. 10,805,051), entitled "WiFi Channel Aggregation," filed on Oct. 16, 2018, which is hereby incorporated by reference in its entirety.

FIELD OF TECHNOLOGY

The present disclosure relates generally to wireless communication systems, and more particularly to data transmission and reception over multiple communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard now under development significantly improves throughput over the IEEE 802.11ac Standard.

SUMMARY

In an embodiment, a method for duplex communication in a wireless local area network (WLAN) includes: generating, at an access point (AP) of the WLAN, a plurality of first media access control (MAC) data units intended for a plurality of client stations of the WLAN; transmitting, by the AP, a multi-user first downlink (DL) transmission to the plurality of client stations via a first WLAN communication channel having a first radio frequency (RF) bandwidth, the multi-user first DL transmission including the plurality of first MAC data units; generating, at the AP, a second MAC data unit having a trigger frame configured to prompt an uplink (UL) multi-user transmission by the plurality of client stations; transmitting, by the AP, a second DL transmission to the plurality of client stations via a second WLAN communication channel having a second RF bandwidth that does not overlap the first RF bandwidth, the second DL transmission including the second MAC data unit; and receiving, at the AP, the UL multi-user transmission from the plurality of client stations via the second WLAN communication channel, the UL multi-user transmission including simultaneous transmissions from the plurality of client stations within the second WLAN communication channel that overlap in time with the multi-user first DL transmission via the first WLAN communication channel.

In another embodiment, an AP configured to operate in a WLAN comprises: a wireless network interface device that includes one or more integrated circuit (IC) devices, a first RF radio implemented at least partially on the one or more IC devices, and a second RF radio implemented at least partially on the one or more IC devices. The one or more IC devices are configured to: generate a plurality of first MAC data units intended for a plurality of client stations of the WLAN; control the first RF radio to transmit a multi-user first DL transmission to the plurality of client stations via a first WLAN communication channel having a first RF bandwidth, the multi-user first DL transmission including the plurality of first MAC data units; generate a second MAC data unit having a trigger frame configured to prompt an UL multi-user transmission by the plurality of client stations; control the second RF radio to transmit a second DL transmission to the plurality of client stations via a second WLAN communication channel having a second RF bandwidth that does not overlap the first RF bandwidth, the second DL transmission including the second MAC data unit; and receive the UL multi-user transmission from the plurality of client stations via the second WLAN communication channel and the second RF radio, the UL multi-user transmission including simultaneous transmissions from the plurality of client stations within the second WLAN communication channel that overlap in time with the multi-user first DL transmission via the first WLAN communication channel.

In yet another embodiment, a method for duplex communication in a WLAN includes: receiving, at a first client station in the WLAN, a multi-user first DL transmission from an AP via a first WLAN communication channel having a first RF bandwidth, the multi-user first DL transmission including at least i) a first MAC data unit intended for the first client station, and ii) one or more second MAC data units intended for one or more respective second client stations in the WLAN; receiving, at the first client station, a second DL transmission from the AP via a second WLAN communication channel having a second RF bandwidth that does not overlap the first RF bandwidth, the second DL transmission including a third MAC data unit having a trigger frame configured to prompt an uplink (UL) multi-user transmission by a plurality of client stations that includes the first client station; generating, at the first client station, a fourth MAC data unit intended for the AP; and in response to the trigger frame, transmitting, by the first client station, the fourth MAC data unit as part of the UL multi-user transmission from the plurality of client stations via the second WLAN communication channel, the UL multi-user transmission including simultaneous transmissions from the plurality of client stations within the second WLAN communication channel that overlap in time with the multi-user first DL transmission via the first WLAN communication channel.

In still another embodiment, a first client station configured to operate in a WLAN comprises a wireless network interface device that includes one or more IC devices, a first RF radio implemented at least partially on the one or more IC devices, and a second RF radio implemented at least partially on the one or more IC devices. The one or more IC devices are configured to: receive a multi-user first DL transmission from an AP via a first WLAN communication channel having a first RF bandwidth and via the first RF radio, the multi-user first DL transmission including at least i) a first MAC data unit intended for the first client station, and ii) one or more second MAC data units intended for one or more respective second client stations in the WLAN;

receive, via the second RF radio, a second DL transmission from the AP via a second WLAN communication channel having a second RF bandwidth that does not overlap the first RF bandwidth, the second DL transmission including a third MAC data unit having a trigger frame configured to prompt an UL multi-user transmission by a plurality of client stations that includes the first client station; generate a fourth MAC data unit intended for the AP; and in response to the trigger frame, control the second RF radio to transmit the fourth MAC data unit as part of the UL multi-user transmission from the plurality of client stations via the second WLAN communication channel, the UL multi-user transmission including simultaneous transmissions from the plurality of client stations within the second WLAN communication channel that overlap in time with the multi-user first DL transmission via the first WLAN communication channel.

DETAILED DESCRIPTION

The Federal Communication Commission (FCC) now permits wireless local area networks (WLANs) to operate in multiple radio frequency (RF) bands, e.g., the 2.4 GHz band (approximately 2.4 to 2.5 GHz), and the 5 GHz band (approximately 5.170 to 5.835 GHz). Recently, the FCC proposed that WLANs can also operate in the 6 GHz band (5.925 to 7.125 GHz). Current IEEE 802.11 Standard protocols only permit a WLAN to operate in one RF band at a time. For example, the IEEE 802.11n Standard protocol is defined only for operation in the 2.4 GHz band, whereas the IEEE 802.11ac Standard protocol is defined only for operation in the 5 GHz band. The IEEE 802.11ax Standard protocol, now under development, will permit a WLAN to operate in the 2.4 GHz band or the 5 GHz band, but not both the 2.4 GHz band and the 5 GHz band at the same time.

A future WLAN protocol, now under development, may permit multi-band operation in which a WLAN can use spectrum in multiple RF bands at the same time. For example, the future WLAN protocol may permit aggregation of spectrum in a first RF band with spectrum in a second RF band to form a composite communication channel that can be used to transmit packets that span the composite communication channel. As another example, the future WLAN protocol may employ frequency division duplex (FDD) techniques in which a first communication channel in a first RF band is used for one type of communications (e.g., downlink data transmissions, or data communications) and a second communication channel in a second RF band is used for another type of communications (e.g., uplink data transmissions, or acknowledgments of the data communications). In some scenarios, FDD techniques provide duplexing gain by allowing traffic in two directions simultaneously, for example, downlink and uplink traffic, or forward and reverse traffic.

Multi-channel communication techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, multi-channel communication techniques are utilized in other types of wireless communication systems such as personal area networks (PANs), mobile communication networks such as cellular networks, metropolitan area networks (MANs), satellite communication networks, etc.

Figure 1:
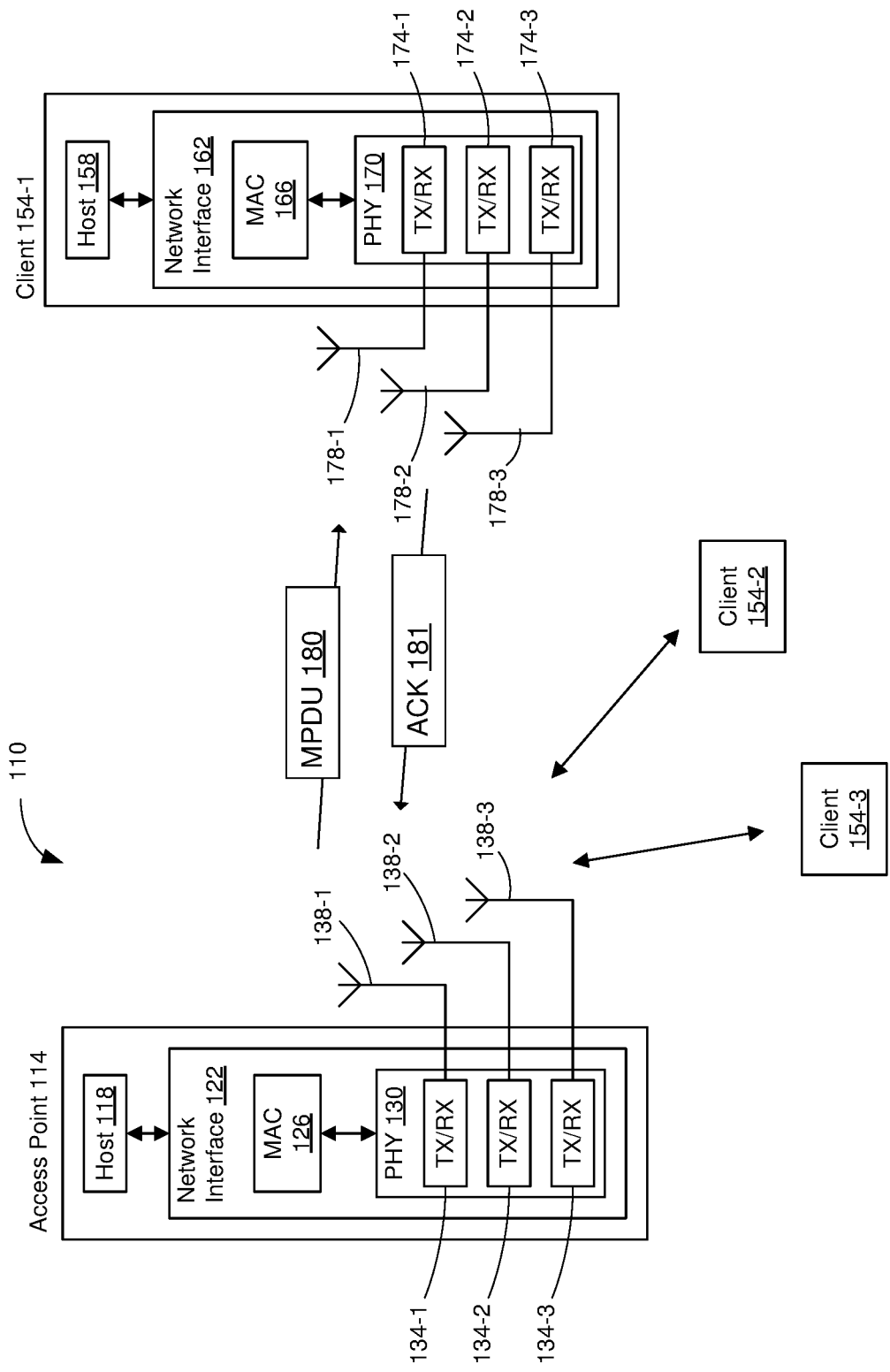
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the network interface device 122 includes multiple PHY processors 130 to facilitate multi-band communication, where respective PHY processors 130 correspond to respective RF bands. In another embodiment, the network interface device 122 includes a single PHY processor 130, where each transceiver 134 includes respective RF radios corresponding to respective RF bands to facilitate multi-band communication.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 6:
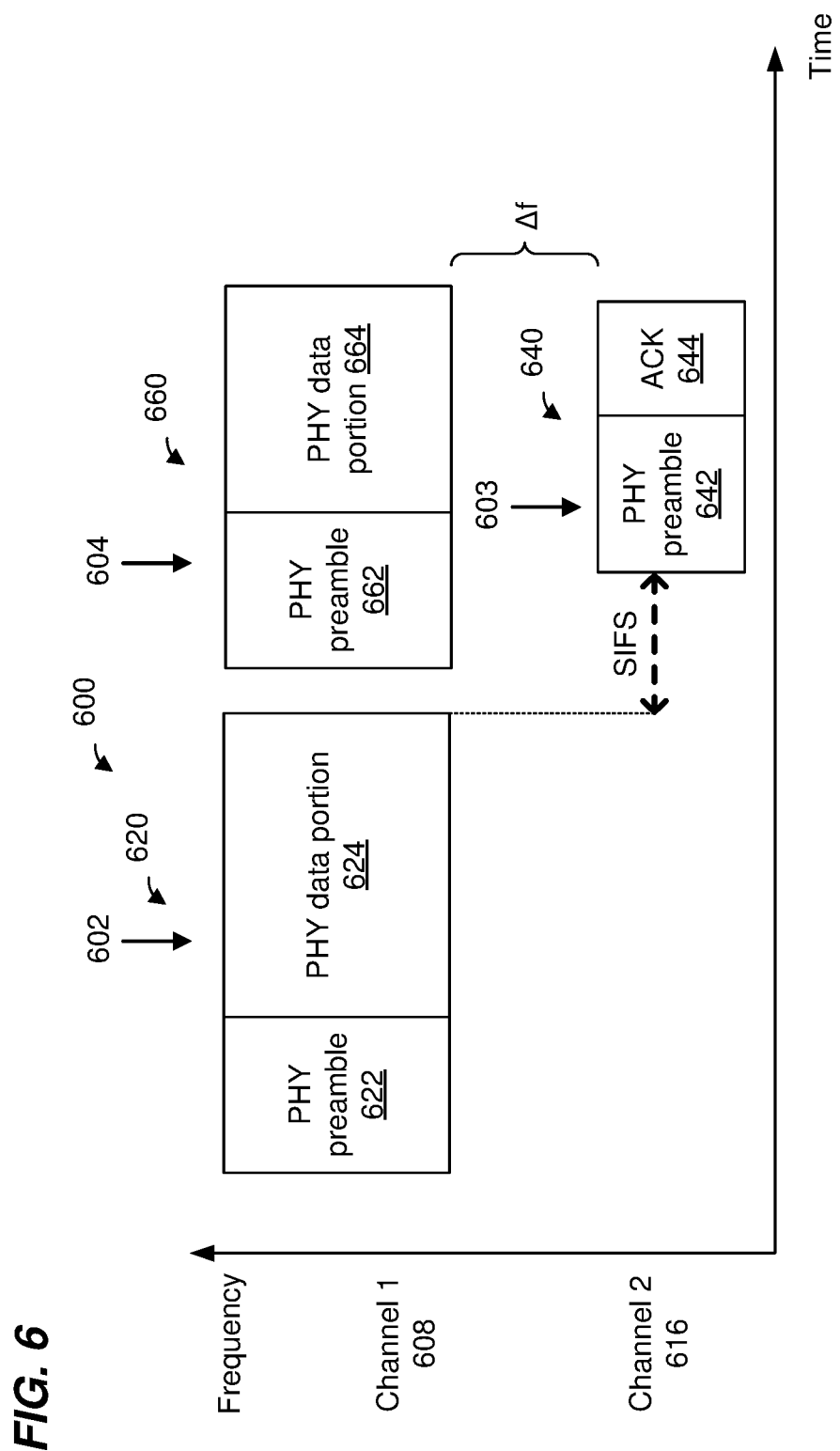
FIG. 6 is a diagram of an example signal transmission sequence over aggregated communication channels using frequency division duplexing, according to an embodiment.

In various embodiments, the AP 114 is configured to generate an MPDU 180 and transmit the MPDU 180 to the client station 154-1 in a first WLAN communication channel (e.g., channel 608, FIG. 6), and further configured to receive an acknowledgment 181 from the client station 154-1 in a second WLAN communication channel (e.g., channel 616, FIG. 6). In an embodiment, the first WLAN communication channel has a first RF bandwidth and the second WLAN communication channel has a second RF bandwidth that does not overlap the first RF bandwidth. In a further embodiment, the first RF bandwidth and the second RF bandwidth are separated by a gap in frequency and are non-contiguous. In at least some scenarios, communication in the WLAN 110 is improved by receiving the acknowledgment 181 in a different communication channel, which provides improved timing efficiency ("duplex gain"). For instance, using the second communication channel frees up the first communication channel for subsequent transmissions thereon without requiring a wait period (e.g., short interframe space) between an end of the MPDU 180 and a beginning of the acknowledgment 181.

FIG. 2A is a diagram of an example PPDU 200 that the network interface device 122 (FIG. 1) is configured to generate and transmit to one or more client stations 154 (e.g., the client station 154-1), according to an embodiment. The network interface device 162 (FIG. 1) may also be configured to transmit data units the same as or similar to the PPDU 200 to the AP 114. The PPDU occupies a 20 MHz bandwidth or another suitable bandwidth, in an embodiment. Data units similar to the PPDU 200 occupy other suitable bandwidth such as 40 MHz, 60 MHz, 80 MHz, 100 MHz, 120 MHz, 140 MHz, 160 MHz, 180 MHz, 200 MHz, etc., for example, in other embodiments.

The PPDU 200 includes a PHY preamble 204 and a PHY data portion 208. The PHY preamble 204 includes at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200.

FIG. 2B is a diagram of an example PHY preamble 220. In an embodiment, the PHY preamble 220 corresponds to the PHY preamble 204. In an embodiment, the PHY preamble 220 is included in the legacy portion 212. In another embodiment, the PHY preamble 220 is included in the non-legacy portion 216. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the number of LTFs in the LTFs 228 correspond to a number of spatial/space-time streams used for transmission of the PPDU 200. In an embodiment, the SIGs 232 are used to signal PHY communication parameters (e.g., a modulation and coding scheme (MCS), a number of spatial streams, a frequency bandwidth, etc.) corresponding to the PPDU 200.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the PPDU 200 is a multi-user (MU) orthogonal frequency division multiple access (OFDMA) data unit in which independent data streams are transmitted to multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is a MU-MIMO PHY data unit in which independent data streams are transmitted to multiple client stations 154 using respective spatial streams allocated to the client stations 154.

In an embodiment, an operating frequency band of a communication device in the WLAN 110 is divided into a plurality of smaller component channels. In an embodiment, the operating frequency band is divided into component channels, each corresponding to a width of 20 MHz, or another suitable frequency bandwidth. Multiple component channels may be concatenated to form a wider channel. For instance, a 40 MHz channel may be formed by combining two 20 MHz component channels, an 80 MHz channel may be formed by combining two 40 MHz channels, a 160 MHz channel may be formed by combining two 80 MHz channels. In an embodiment, the operating frequency band is divided into component channels of a width different than 20 MHz.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively. In some such embodiments, at least a portion of the PPDU 200 (e.g., at least a legacy portion of the PHY preamble 204, or the entirety of the PHY preamble 204) is generated by generating a field corresponding to a 20 MHz component channel bandwidth and repeating the field over a number of 20 MHz component channels corresponding to the transmission channel, in an embodiment. For example, in an embodiment in which the PPDU 200 occupies an 80 MHz channel, at least the legacy portion 212 corresponding to the 20 MHz component channel bandwidth is replicated in each of four 20 MHz component channels that comprise the 80 MHz channel.

In an embodiment, one or more communication devices in the WLAN 110 (e.g., the AP 114, the client station 154, etc.) are configured for various multi-channel operations. In an embodiment, multi-channel operation includes multi-band communication, i.e., operating according to a communication protocol that permits concurrent operation of a single wireless network across multiple RF bands and includes hardware that is configured to provide concurrent communications over multiple RF bands. Such communication devices are referred to herein as "multi-band communication devices" or frequency division duplexing (FDD) communication devices. In an embodiment, at least one client station 154 (e.g., the client station 154-3) may include hardware or may operate according to a communication protocol (e.g., a legacy communication protocol) that is not configured for multi-band communications (i.e., the protocol only permits a wireless network to operate in a single RF band at a given time), and may operate only in one of the multiple RF bands (at a given time) being used by multi-band devices. Such communication devices are referred to herein as "single-band communication devices".

In an embodiment, one or more communication devices in the WLAN 110 (e.g., the AP 114, the client station 154, etc.) are configured for various multi-channel operations. In an embodiment, multi-channel operation corresponds asynchronous dual-band concurrent (DBC) operation over two or more communication channels. For instance, in an embodiment, the AP 114 is configured to transmit a first signal in a first communication channel, and simultaneously transmit a second signal over a second communication channel. In an embodiment, the AP 114 is configured to transmit a first signal in a first communication channel, and simultaneously receive a second signal over a second communication channel. In an embodiment, the AP 114 is configured to receive a first signal in a first communication channel, and simultaneously receive a second signal over a second communication channel. In any of the above cases corresponding to DBC operation, the transmission/reception of the first signal and the second signal may be asynchronous. For instance, in an embodiment, one or both of corresponding start times and end times of the first signal and the second signal may be different.

In various embodiments, multiple different frequency bands within the RF spectrum are employed for signal transmissions within the WLAN 110. In an embodiment, different communication devices (i.e., the AP 114 and the client stations 154) may be configured for operation in different frequency bands (e.g., radio frequency bandwidths). In an embodiment, at least some communication devices (e.g., the AP 114 and the client station 154) in the WLAN 110 may be configured for operation over multiple different frequency bands. In an embodiment, the first communication channel is separated in frequency from the second communication channel, i.e., there is a gap in frequency between the first communication channel and the second communication channel (in other words, the first communication channel is not contiguous with the second communication channel). In an embodiment, the first communication channel and the second communication channel do not overlap each other.

Exemplary frequency bands include, a first frequency band corresponding to a frequency range of approximately 2.4 GHz-2.5 GHz ("2 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band"). Each of the frequency bands comprise multiple component channels which may be combined within the respective frequency bands to generate channels of wider bandwidths, as described above. In an embodiment corresponding to multi-channel operation over a first communication channel and a second communication channel, the first communication channel and the second communication channel may be in separate frequency bands, or within a same frequency band.

In an embodiment, the first communication channel and the second communication channel have different frequency bandwidths (e.g., 80 MHz and 20 MHz, 80 MHz and 40 MHz, 160 MHz and 20 MHz, or other suitable bandwidths). In an embodiment, the first communication channel and the second communication channel consist of respective different numbers of component channels.

Figure 3:
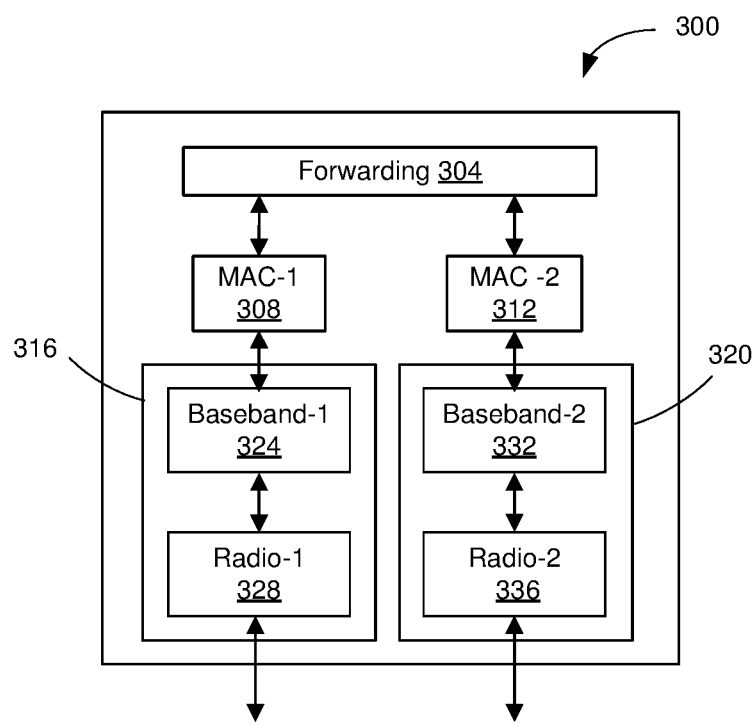
FIG. 3 is a block diagram of an example system architecture configured for multi-channel communication, according to an embodiment.

FIG. 3 is a diagram of a system architecture corresponding to a communication device 300 configured for DBC operation (e.g., a multi-band communication device). In an embodiment, the communication device 300 corresponds to the AP 114. In another embodiment, the communication device 300 corresponds to the client station 154-1. In an embodiment, the communication device 300 is configured for operation over two or more RF bands. For example, in an embodiment, the communication device 300 is configured to communicate via a first WLAN communication channel having a first RF bandwidth and via a second WLAN communication channel having a second RF bandwidth that does not overlap the first RF bandwidth. In some embodiments, the communication device 300 includes a packet forwarding processor 304 configured to forward packets among the two RF bands and another network connection (e.g., a wired connection or wide area network connection, not shown). The communication device 300 also includes a first MAC processor 308 (MAC-1), a second MAC processor 312 (MAC-2), a first PHY processor 316, and a second PHY processor 320. The first MAC processor 308 is coupled to the first PHY processor 316, and the second MAC processor 312 is coupled to the second PHY processor 320. The first MAC processor 308 exchanges frames with the first PHY processor 316, and the second MAC processor 312 exchanges frames with the second PHY processor 320.

In an embodiment, first MAC processor 308 and the second MAC processor 312 correspond to the MAC processor 126 of FIG. 1. In another embodiment, the first MAC processor 308 and the second MAC processor 312 correspond to the MAC processor 166 of FIG. 1. In an embodiment, the first PHY processor 316 and the second PHY processor 320 correspond to the PHY processor 130 of FIG. 1. In another embodiment, the first PHY processor 316 and the second PHY processor 320 correspond to the PHY processor 170 of FIG. 1.

The first PHY processor 316 includes a first baseband signal processor 324 (Baseband-1) coupled to a first RF radio 328 (Radio-1). The second PHY processor 320 includes a second baseband signal processor 332 (Baseband-2) coupled to a second RF radio 336 (Radio-2). In an embodiment, the RF radio 328 and the RF radio 336 correspond to the transceivers 134 of FIG. 1. In another embodiment, the RF radio 328 and the RF radio 336 correspond to the transceivers 174 of FIG. 1. In some embodiments, the RF radio 328 is configured to operate on a first RF band, and the RF radio 336 is configured to operate on a second RF band. In an embodiment, the first RF band is different from the second RF band, for example, the first RF band does not overlap the second RF band. In a further embodiment, the first RF band is separated from the second RF band by a frequency gap of, for example, 10 MHz, 20 MHz, 500 MHz, or another suitable frequency gap. In an embodiment, the frequency gap includes one or more communication channels that are not used by the communication device 300, but are used by other communication devices, for example, other WLAN access points, WLAN client stations, or other wireless communication devices (not shown). In another embodiment, the RF radio 328 and the RF radio 336 are both configured to operate on the same RF band.

The MAC-1 308 is configured to generate frames and to provide the frames to the Baseband-1 324. The Baseband-1 324 is configured to receive frames from the MAC-1 308, generate a baseband signal corresponding to PPDUs. The Radio-1 328 upconverts the baseband signal and generates RF signals corresponding to the PPDUs for transmission over the first communication channel via one or more antennas (not shown). Similarly, the Radio-1 328 is configured to receive RF signals corresponding to PPDUs received over the first communication channel via the one or more antennas and generate a baseband signal corresponding to the received PPDUs. The Baseband-1 324 decodes and de-encapsulates the PPDUs to generate frames and provides the frames to the MAC-1 308. The MAC-1 308 processes the frames.

Operations of the MAC-2 312, the Baseband-2 332, and the Radio-2 336 correspond to operations of the MAC-1 308, the Baseband-1 324, and the Radio-1 328 as described above, except that the MAC-2 312, the Baseband-2 332, and the Radio-2 336 operate in the second communication channel. For instance, MAC-2 312, the Baseband-2 332, and the Radio-2 336 generate/transmit PPDUs and receive/process PPDUs transmitted/received over the second communication channel.

In an embodiment corresponding to DBC operation, the MAC-1 308, the Baseband-1 324, the MAC-2 312, and the Baseband-2 332 are configured for asynchronous operation in the first communication channel and the second communication channel. For instance, transmissions/receptions in the first communication channel are not synchronized or coordinated with transmissions/receptions in the second communication channel, according to an embodiment. For instance, the MAC-1 308 and the MAC-2 312 do not coordinate media access control functions, and the Baseband-1 324 and the Baseband-2 332 do not coordinate transmission timing, according to an embodiment.

In an embodiment, the forwarding processor 304 is omitted and the MAC-1 308 and the MAC-2 312 are coupled to another suitable processor (e.g., the host processor 118 (FIG. 1)) that performs one or more higher level operations corresponding to data transmission and reception over the multiple communication channels. For instance, in an embodiment, the processor performs one or more operations corresponding to Layer 3 and above, as characterized in the Open Systems Interconnection (OSI) model.

Although only two MAC processors and two PHY processors are shown in FIG. 3, the communication device 300 has three, four, or more MAC processors and PHY processors that are configured to communicate on three, four, or more respective communication channels, in various embodiments. In an embodiment, for example, the communication device 300 includes i) the MAC processor 308 and PHY processor 316 configured to operate in the 2.4 GHz band, ii) the MAC processor 312 and PHY processor 320 configured to operate in the 5 GHz band, and iii) a MAC processor (not shown) and PHY processor (not shown) configured to operate in the 6 GHz band (or another suitable band).

Figure 4A:
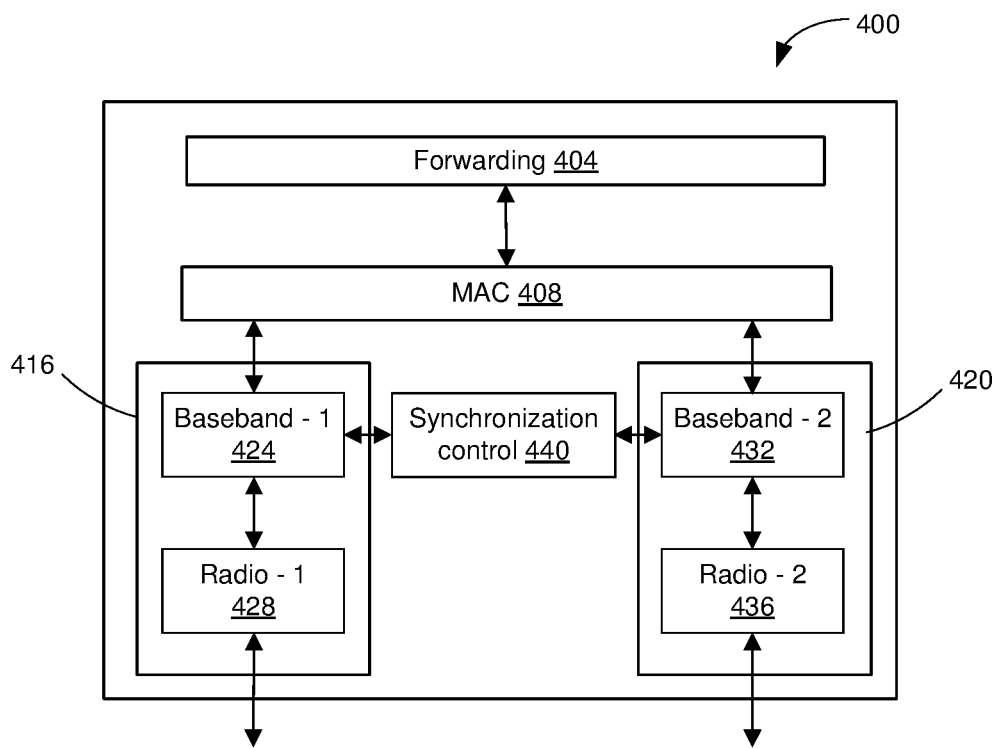
FIG. 4A is a diagram of an example system architecture corresponding to a communication device configured for multi-channel operation, according to an embodiment.

FIG. 4A is a diagram of an example system architecture corresponding to a communication device 400 configured for multi-channel operation (e.g., a multi-band communication device), according to an embodiment. For instance, in an embodiment, the communication device 400 is configured for synchronous or asynchronous transmission/reception over aggregated communication channels. In an embodiment, the communication device 400 corresponds to the AP 114. In another embodiment, the communication device 400 corresponds to the client station 154-1.

In an embodiment, the communication device 400 is configured for operation over two or more communication channels and includes a forwarding processor 404. The communication device 400 also includes a single MAC processor 408, a first PHY processor 416, and a second PHY processor 420. The single MAC processor 408 is coupled to the first PHY processor 416 and the second PHY processor 420. The single MAC processor 408 exchanges frames with the first PHY processor 416 and the second PHY processor 420.

In an embodiment, the single MAC processor 408 corresponds to the MAC processor 126 of FIG. 1. In another embodiment, the single MAC processor 408 corresponds to the MAC processor 166 of FIG. 1. In an embodiment, the first PHY processor 416 and the second PHY processor 420 correspond to the PHY processor 130 of FIG. 1. In another embodiment, the first PHY processor 416 and the second PHY processor 420 correspond to the PHY processor 170 of FIG. 1.

The first PHY processor 416 includes a first baseband signal processor 424 (Baseband-1) coupled to a first RF radio 428 (Radio-1). The second PHY processor 420 includes a second baseband signal processor 432 (Baseband-2) coupled to a second RF radio 436 (Radio-2). In an embodiment, the RF radio 428 and the RF radio 436 correspond to the transceivers 134 of FIG. 1. In an embodiment, the RF radio 428 is configured to operate on a first RF band, and the RF radio 436 is configured to operate on a second RF band. In another embodiment, the RF radio 428 and the RF radio 436 are both configured to operate on the same RF band.

Although only two PHY processors 416 and 420 are shown in the embodiment of FIG. 4A, in another embodiment, the communication device 400 includes one or more additional PHY processors (not shown), for instance, a third PHY processor (not shown) configured to operate on yet another RF band that is different from the first and second RF bands. In an embodiment, for example, the first, second, and third PHY processors are configured to operate on the 2.4 GHz, 5 GHz, and 6 GHz bands, respectively. In other embodiments, other suitable bands are utilized (e.g., 60 GHz, "sub-1 GHz" or 900 MHz, 3.6 GHz, 4.9 GHz, etc.).

In an embodiment, the MAC processor 408 generates and parses data corresponding to MAC layer data units (e.g., frames) into a plurality of data streams corresponding to respective communication channels. The MAC processor 408 provides the parsed data streams to the Baseband-1 424 and the Baseband-2 432. The Baseband-1 424 and the Baseband-2 432 are configured to receive the respective data streams from the MAC processor 408, and encapsulate and encode the respective data streams to generate respective baseband signals corresponding to PPDUs. In an embodiment, the respective baseband signals have different bandwidths. The Baseband-1 424 and the Baseband-2 432 provide the respective baseband signals to the Radio-1 428 and the Radio-2 436. The Radio-1 428 and Radio-2 436 upconvert the respective baseband signals to generate respective RF signals for transmission via the first communication channel and the second communication channel, respectively. The Radio-1 428 transmits a first RF signal via the first communication channel and the Radio-2 436 transmits a second RF signal via a second communication channel.

The communication device 400 also includes synchronization control circuitry 440, in some embodiments. The synchronization control circuitry 440 is configured to ensure that respective transmitted signals over the first communication channel and the second communication channel are synchronized. The synchronization control circuitry 440 is coupled to the Baseband-1 424 and the Baseband-2 432 to ensure that the respective baseband signals are synchronized in time. In some embodiments, the synchronization control circuitry 440 ensures that some transmitted signals are synchronized, while other transmitted signals are not synchronized.

The Radio-1 428 and the Radio-2 436 are also configured to receive respective RF signals via the first communication channel and the second communication channel, respectively. The Radio-1 428 and the Radio-2 436 generate respective baseband signals corresponding to the respective received signals. In an embodiment, the generated respective baseband signals have different bandwidths. The generated respective baseband signals are provided to the respective baseband signal processors Baseband-1 424 and Baseband-2 432. The Baseband-1 424 and the Baseband-2 432 generate respective data streams that are provided to the MAC processor 408. The MAC processor 408 processes the respective data streams. In an embodiment, the MAC processor 408 deparses the data streams received from the Baseband-1 424 and the Baseband-2 432 into a single information bit stream.

In an embodiment, the forwarding processor 404 is omitted and the MAC processor 408 is coupled to another suitable processor (e.g., the host processor 118 (FIG. 1)) that performs one or more higher level operations corresponding to data transmission and reception. For instance, in an embodiment, the other processor performs one or more operations corresponding to Layer 3 and above as characterized in the OSI model.

Figure 4B:
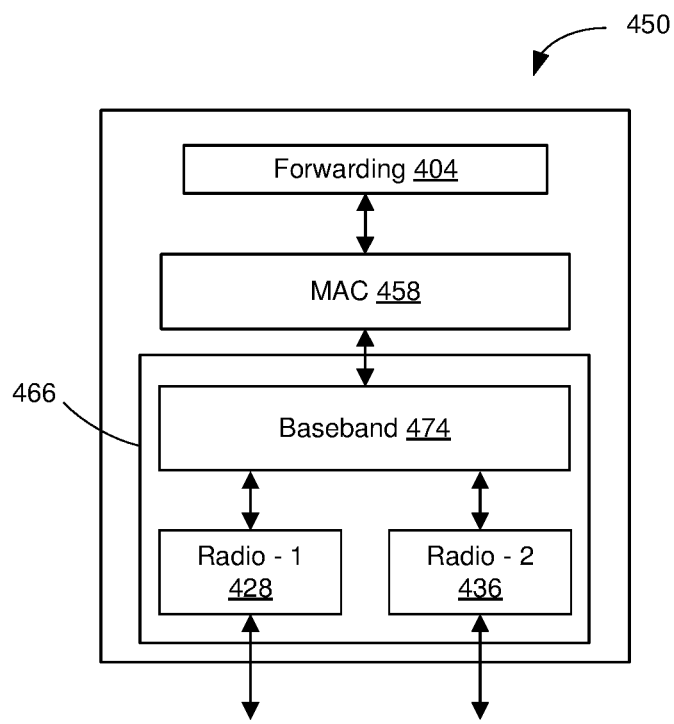
FIG. 4B is a diagram of another example system architecture corresponding to a communication device configured for multi-channel operation, according to another embodiment.

FIG. 4B is a diagram of an example system architecture corresponding to a communication device 450 configured for multi-channel operation (e.g., a multi-band communication device), according to another embodiment. For instance, in an embodiment, the communication device 450 is configured for synchronous or asynchronous transmission/reception over aggregated communication channels. In an embodiment, the communication device 450 corresponds to the AP 114. In another embodiment, the communication device 450 corresponds to the client station 154-1. The communication device 450 is similar to the communication device 400 of FIG. 4A, and like-numbered elements are not discussed in detail for purposes of brevity.

The communication device 450 includes a single MAC processor 458 coupled to a PHY processor 466. The single MAC processor 408 exchanges frames with the PHY processor 466. In an embodiment, the single MAC processor 458 corresponds to the MAC processor 126 of FIG. 1. In another embodiment, the single MAC processor 458 corresponds to the MAC processor 166 of FIG. 1. In an embodiment, the PHY processor 466 corresponds to the PHY processor 130 of FIG. 1. In another embodiment, the PHY processor 466 corresponds to the PHY processor 170 of FIG. 1. The PHY processor 466 includes a single baseband signal processor 474. The single baseband signal processor 474 is coupled to the Radio-1 428 and the Radio-2 436.

In an embodiment, the MAC processor 458 generates data corresponding to MAC layer data units (e.g., frames) and provides the frames to the baseband signal processor 474. The baseband signal processor 474 is configured to receive frames from the MAC processor 458, and parse data corresponding to the frames into a plurality of bit streams. The baseband signal processor 474 is also configured to encapsulate and encode the respective bit streams to generate respective baseband signals corresponding to PPDUs. In an embodiment, the respective baseband signals have different bandwidths. The baseband signal processor 474 provides the respective baseband signals to the Radio-1 428 and the Radio-2 436. The Radio-1 428 and Radio-2 436 upconvert the respective baseband signals to generate respective RF signals for transmission via the first communication channel and the second communication channel, respectively. The Radio-1 428 transmits a first RF signal via the first communication channel and the Radio-2 436 transmits a second RF signal via a second communication channel.

The baseband signal processor 474 is configured to ensure that respective transmitted signals over the first communication channel and the second communication channel are synchronized, in some embodiments. For example, the baseband signal processor 474 is configured to generate the respective baseband signals such that the respective baseband signals are synchronized in time.

The Radio-1 428 and the Radio-2 436 are also configured to receive respective RF signals via the first communication channel and the second communication channel, respectively. The Radio-1 428 and the Radio-2 436 generate respective baseband signals corresponding to the respective received signals. In an embodiment, the generated respective baseband signals have different bandwidths. The generated respective baseband signals are provided to the baseband signal processor 474. The baseband signal processor 474 generate respective bit streams, and de-parse the bit streams into a data stream corresponding to frames. The baseband signal processor 474 provides the frames to the MAC processor 458. The MAC processor 458 processes the frames.

Although only two RF radios 428 and 436 are shown in the embodiment of FIG. 4B, in another embodiment, the communication device 400 includes one or more additional RF radios (not shown), for instance, a third RF radio (not shown) configured to operate on yet another RF band that is different from the first and second RF bands. In an embodiment, for example, the first, second, and third RF radios are configured to operate on the 2.4 GHz, 5 GHz, and 6 GHz bands, respectively. In other embodiments, other suitable bands are utilized (e.g., 60 GHz, "sub-1 GHz" or 900 MHz, 3.6 GHz, 4.9 GHz, etc.).

Figure 5:
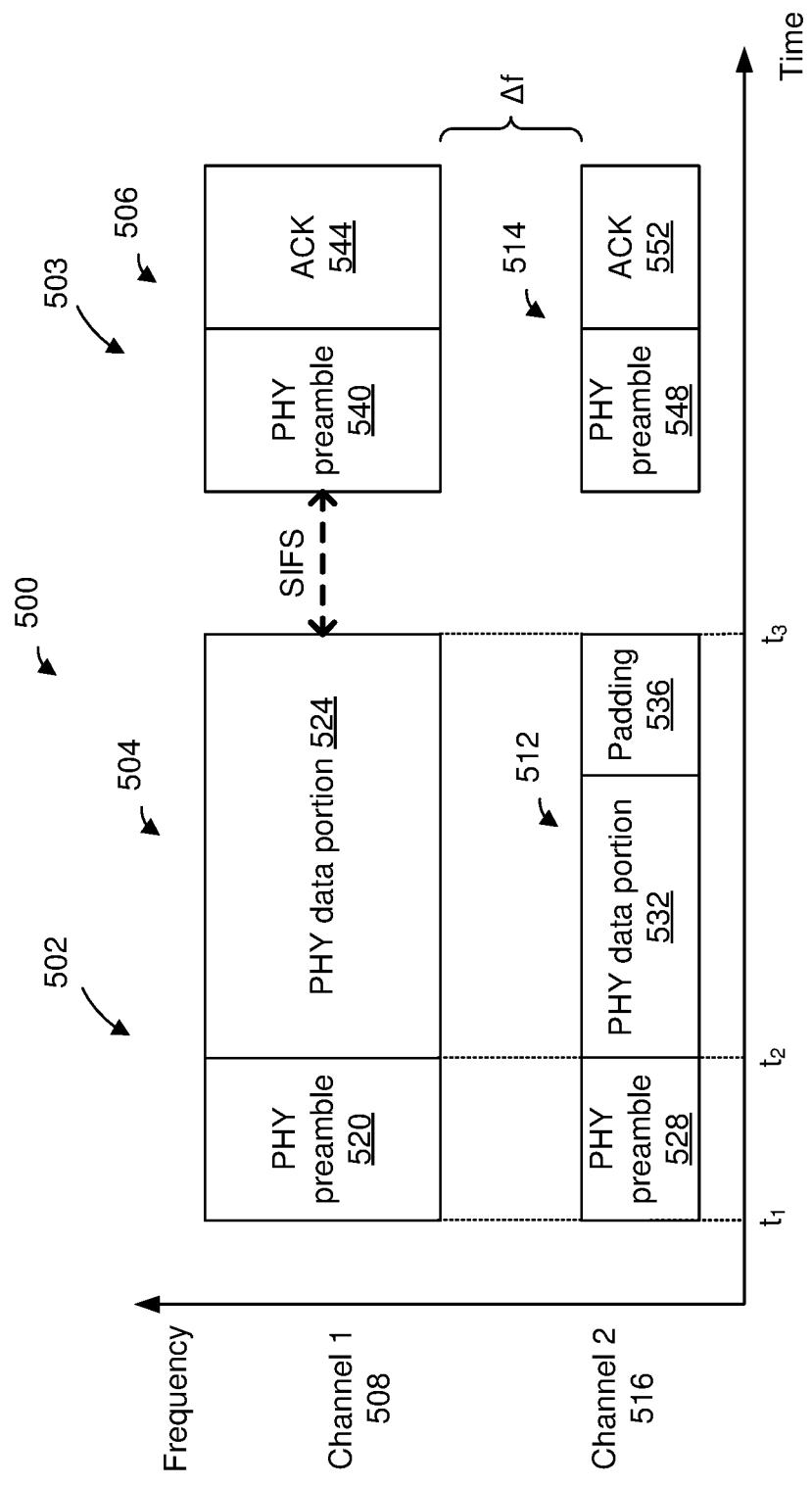
FIG. 5 is a diagram of an example signal transmission sequence over aggregated communication channels, according to an embodiment.

FIG. 5 is a diagram of an example synchronized transmission sequence 500 over aggregated communication channels, according to an embodiment. In an embodiment, the transmission sequence 500 is generated and transmitted by the network interface device 122 (FIG. 1) to one or more client stations 154 (e.g., the client station 154-1). In an embodiment, the network interface device 122 generating the transmission sequence 500 has a structure of the communication device 400 (FIG. 4A). In another embodiment, the network interface device 122 generating the transmission sequence 500 has a structure of the communication device 450 (FIG. 4B). In another embodiment, the transmission sequence 500 is generated and transmitted by the network interface device 162 (FIG. 1) to the AP 114. In an embodiment, the network interface device 162 generating the transmission sequence 500 has a structure of the communication device 400 (FIG. 4A). In another embodiment, the network interface device 162 generating the transmission sequence 500 has a structure of the communication device 450 (FIG. 4B).

In an embodiment, the transmission sequence 500 corresponds to a single user (SU) transmission that is generated and transmitted to a single communication device. In an embodiment, the transmission sequence 500 corresponds to a multi-user (MU) transmission that includes data for multiple communication devices (e.g., the client stations 154). For example, in an embodiment, the MU transmission sequence 500 is an OFDMA transmission. In another embodiment, the MU transmission sequence 500 is a MU-MIMO transmission.

In the embodiment shown in FIG. 5, the transmission sequence 500 includes a downlink transmission 502 and an uplink transmission 503. In another embodiment, the directions of the transmissions 502 and 503 are reversed so that the transmission 502 is an uplink transmission and the transmission 503 is a downlink transmission. The downlink transmission 502 includes a first RF signal 504 in a first communication channel 508 and a second RF signal 512 in a second communication channel 516. The first RF signal 504 comprises a PHY preamble 520 and a PHY data portion 524. The second RF signal 512 comprises of a PHY preamble 528, a data portion 532, and optional padding 536. The uplink transmission 503 includes a third RF signal 506 in the first communication channel 508 and a fourth RF signal 514 in the second communication channel 516. The third RF signal 506 comprises a PHY preamble 540 and a PHY data portion 544. The second RF signal 512 comprises a PHY preamble 548 and a data portion 552. In an embodiment, the first and second RF signals 504 and 512 include correspond to downlink MPDUs transmitted to a client station 154, while the third and fourth RF signals 506 and 514 correspond to acknowledgments of the downlink MPDUs (e.g., the respective PHY data portions include ACK frames, block ACK frames, or other suitable acknowledgments) transmitted by the client station 154. In an embodiment, the client station 154 transmits the third and fourth RF signals 506 and 514 after a short interframe space (SIFS), for example, to allow a suitable time for the client station 154 to process and generate the third and fourth RF signals 506 and 514.

In an embodiment, transmission of the first RF signal 504 and the second RF signal 512 are synchronized such that they start at a same time instance $t_1$ and end at a same time instance $t_3$. In an embodiment, the transmission sequence 500 is further synchronized such that the PHY preamble 520 and the PHY preamble 528 are of a same duration. In an embodiment in which the PHY data portion 532 has a shorter duration than the PHY data portion 524, the PHY data portion 532 is appended with the padding 536 so that transmission of the signal 512 ends at $t_3$.

Figure 2:
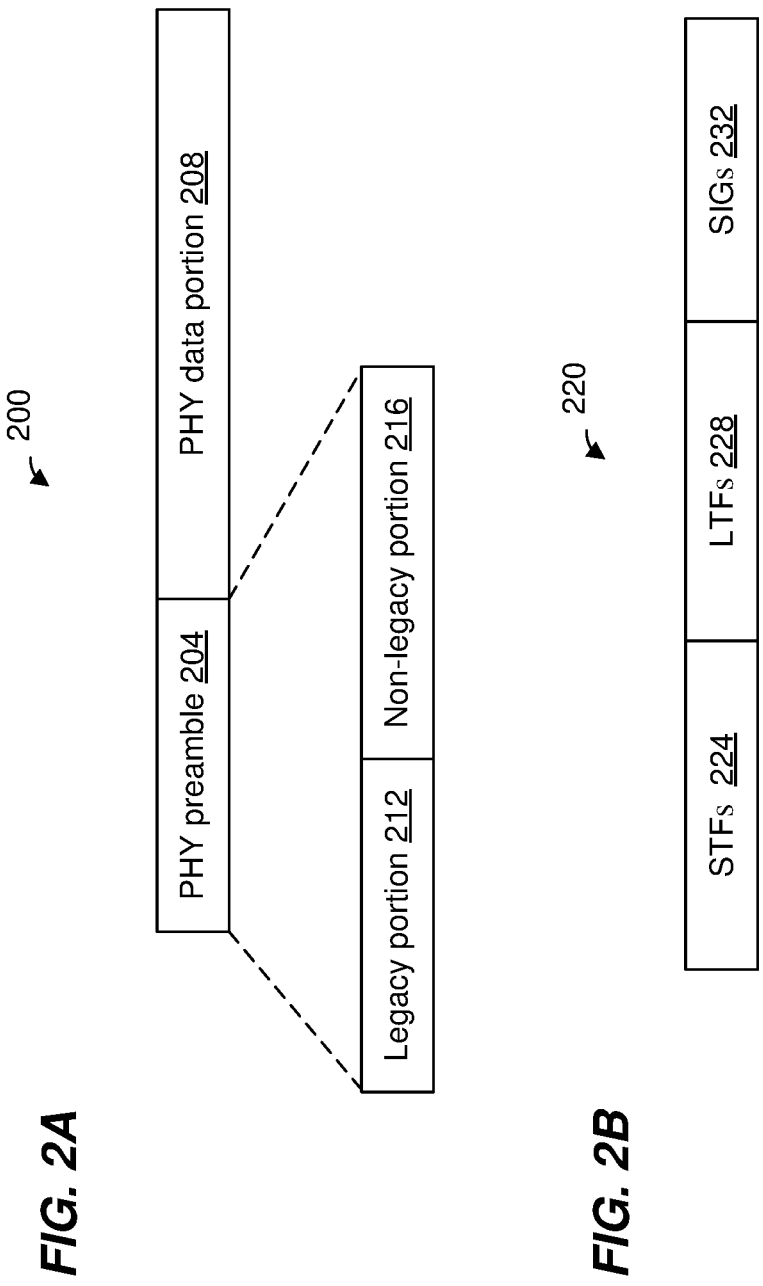
FIG. 2A is a block diagram of an example physical layer (PHY) data unit, according to an embodiment.
FIG. 2B is a block diagram of an example preamble of a PHY data unit, according to an embodiment.

In an embodiment, the PHY preamble 520 and the PHY preamble 528 are formatted in a manner similar to the PHY preamble 204 of FIG. 2. In an embodiment, at least a portion of the PHY preamble 520 and at least a portion of the PHY preamble 528 have the same structure and/or include the same information. In an embodiment, at least a portion of the PHY preamble 520 and at least a portion of the PHY preamble 528 are identical.

In various embodiments, the first communication channel 508 and the second communication channel 516 are in different RF bands or are co-located in a same RF band. In an embodiment, the RF band(s) correspond to the 2 GHz band, the 5 GHz band, the 6 GHz band, or other suitable band, as described above. The first communication channel 508 and the second communication channel 516 may each be comprised of one or more of component channels. In an embodiment, a frequency bandwidth of the first communication channel 508 (i.e., a frequency bandwidth of the first RF signal 504 and third RF signal 506) is different than a frequency bandwidth of the second communication channel 516 (i.e., a frequency bandwidth of the second RF signal 512 and the fourth RF signal 514). In various embodiments, for example, respective RF bandwidths of the first communication channel 508 and the second communication channel 516 are 80 MHz and 20 MHz, 160 MHz and 20 MHz, 320 MHz and 40 MHz, or other suitable bandwidths. In another embodiment, the RF bandwidth of the first communication channel 508 is the same as the RF bandwidth of the second communication channel 516.

In an embodiment, the first communication channel 508 and the second communication channel 516 do not overlap. In a further embodiment, the first communication channel 508 and the second communication channel 516 are separated in frequency, e.g., the channels are non-contiguous. For example, a gap Δf in frequency exists between the first communication channel 508 and the second communication channel 516. In various embodiments, the gap Δf is at least 500 kHz, at least 1 MHz, at least 5 MHz, at least 20 MHz, etc. In some embodiments, the gap Δf is 320 MHz, 500 MHz, 1 GHz, or more, for example, where the first communication channel 508 is within the 2.4 GHz band and the second communication channel 516 is within the 5 GHz band.

In some embodiments, the first RF signal 504 is transmitted via a first number of spatial or space-time streams (hereinafter referred to as "spatial streams" for brevity), and the second RF signal 512 is transmitted via a second number of spatial streams that is different than the first number of spatial streams. In one such embodiment, the PHY preamble 520 and the PHY preamble 528 comprise a same number of LTFs even when the first RF signal 504 is transmitted via a first number of spatial streams and the second RF signal 512 is transmitted via a second number of spatial streams that is different than the first number of spatial streams. In an embodiment, the same number of LTFs correspond to one of the first signal 404 and the second signal 412 with the larger number of spatial streams. In other embodiments, the first RF signal 504 and the second RF signal 512 are transmitted via a same number of spatial streams.

In an embodiment, at least the PHY data portion 524 and at least the PHY data portion 532 employ different encoding schemes and/or modulation schemes. As an example, in an embodiment, the PHY data portion 524 is generated using a first MCS and the PHY data portion 432 is generated using a second, different MCS. In other embodiments, the PHY data portion 524 and the PHY data portion 532 are generated using a same MCS.

In an embodiment, the transmission sequence 500 corresponds to a single PPDU, where a first frequency portion of the single PPDU is transmitted via the first channel 508 and a second frequency portion of the single PPDU is transmitted via the second channel 516. In another embodiment, the first RF signal 504 corresponds to a first PPDU and the second RF signal 512 corresponds to a second PPDU. In an embodiment, each of the PHY preambles 520 and 528, and the PHY data portions 524 and 532, are comprised of one or more OFDM symbols.

In various embodiments, the communication device 400 (FIG. 4A) is configured to generate at least a portion of the transmission sequence 500 and to receive at least a portion of the transmission sequence 500. In an embodiment, for example, the communication device 400 synchronously transmits the RF signals 504 and 512 and receives the RF signals 506 and 514. In another embodiment, the communication device 400 receives the RF signals 504 and 512 and synchronously transmits the RF signals 506 and 514.

In another embodiment, the communication device 450 (FIG. 4B) is configured to generate at least a portion of the transmission sequence 500 and to receive at least a portion of the transmission sequence 500. In an embodiment, for example, the communication device 450 synchronously transmits the RF signals 504 and 512 and receives the RF signals 506 and 514. In another embodiment, the communication device 450 receives the RF signals 504 and 512 and synchronously transmits the RF signals 506 and 514.

FIG. 6 is a diagram of an example signal transmission sequence 600 over aggregated communication channels using frequency division duplexing, according to an embodiment. In the embodiment shown in FIG. 6, the transmission sequence 600 includes transmissions 602, 603, and 604, where the transmissions 602 and 604 are downlink transmissions (e.g., from the AP 114 to one or more client stations 154) in a first communication channel 608 and the transmission 603 is an uplink transmission (e.g., from the client stations 154 to the AP 114) in a second communication channel 616. In other words, the first communication channel 608 of the aggregated communication channels is designated for downlink traffic and the second communication channel 616 of the aggregated communication channels is designated for uplink traffic. The communication channels 608 and 616 are similar to the communication channels 508 and 516 described above with respect to FIG. 5. Accordingly, the communication channels 608 and 616 are in different RF bands (e.g., 2 GHz, 5 GHz, 6 GHz, etc.), in various embodiments.

In another embodiment, the transmissions 602 and 604 are uplink transmissions and the transmission 603 is a downlink transmission. In other words, the first communication channel 608 is designated for uplink traffic and the second communication channel 616 is designated for downlink traffic. In yet another embodiment, the first communication channel 608 is designated for forward traffic and the second communication channel 616 is designated for reverse traffic (e.g., acknowledgments to the forward traffic). In other words, management frames and data frames are transmitted on the first communication channel 608 regardless of whether they are transmitted by the AP 114 or by the client station 154, while acknowledgment frames are similarly transmitted on the second communication channel 616. In some embodiments, the AP 114 transmits a trigger frame (e.g., trigger frame 742, FIG. 7) to one or more client stations 154 to trigger an uplink transmission (e.g., uplink transmission 603).

In the embodiment shown in FIG. 6, the downlink transmission 602 includes a first RF signal 620 having a PHY preamble 622 and PHY data portion 624, the downlink transmission 604 includes a second RF signal 660 having a PHY preamble 662 and a PHY data portion 664, and the uplink transmission 603 includes a third RF signal 640 having a PHY preamble 642 and PHY data portion 644. The PHY preambles 622 and 662 are similar to the PHY preamble 520, while the PHY data portions 624 and 664 are similar to the PHY data portion 524.

The PHY preamble 642 is similar to the PHY preamble 540 and the PHY data portion 644 is similar to the PHY data portion 544. However, in the embodiment shown in FIG. 6, the client station transmits the third RF signal 660 (i.e., the acknowledgment of the first RF signal 620) in the second communication channel 616, instead of the first communication channel 608. In some scenarios, the AP 114 and client stations 154 designate the first communication channel 608 for forward traffic or downlink traffic and designate the second communication channel 616 for uplink traffic or reverse traffic when the first communication channel 608 has a larger RF bandwidth (e.g., higher data transmission capacity) than the second communication channel 616. In some such scenarios, the overall throughput of the WLAN 110 is improved because the higher capacity channel (the first communication channel 608) is not monopolized by the second RF signal 640 and the SIFS period that precedes the second RF signal 640 before the third RF signal 660 can be transmitted. In some scenarios, by utilizing frequency division duplexing with the first communication channel 608 and the second communication channel 616 with separate RF radios (i.e., RF radios 428 and 436) in non-overlapping RF bandwidths, the AP 114 and client stations 154 have improved MAC protocol efficiency because traffic in both directions (uplink and downlink, forward and reverse, etc.), such as the RF signals 640 and 660, can be transmitted and received simultaneously.

In various embodiments, the communication device 400 (FIG. 4A) is configured to generate at least a portion of the transmission sequence 600 and to receive at least a portion of the transmission sequence 600. In an embodiment, for example, the communication device 400 transmits the RF signals 620 and 660 and receives RF signal 640. In another embodiment, the communication device 400 receives the RF signals 620 and 660 and transmits the RF signal 640.

In some embodiments, the communication device 450 (FIG. 4B) is configured to generate at least a portion of the transmission sequence 600 and to receive at least a portion of the transmission sequence 600. In an embodiment, for example, the communication device 450 transmits the RF signals 620 and 660 and receives RF signal 640. In another embodiment, the communication device 450 receives the RF signals 620 and 660 and transmits the RF signal 640.

In an embodiment, the communication device 400 or the communication device 450 is configured to select the bands of the first and second communication channels 608 and 616 so that interference between the communication channels is reduced. In an embodiment, for example, when the 2.4 GHz band, the 5 GHz band, and 6 GHz band are available, the communication device 400 selects the 6 MHz band and the 2.4 GHz band for the first and second communication channels 608 and 616, respectively, so that interference between the communication channels is reduced.

In an embodiment, the communication device 400 or 450 is configured to select RF bandwidths for the first and second communication channels 608 and 616 so that interference between the communication channels is reduced (e.g., interference caused by the simultaneous reception of the third RF signal 603. In an embodiment, for example, the communication device 400 selects a 320 MHz bandwidth in an upper frequency range of the 6 GHz band (e.g., 6530-6850 MHz) for the first communication channel 608 and selects a 40 MHz bandwidth in a lower frequency range of the 5 GHz band (e.g., 5150 MHz to 5190 MHz) for the second communication channel 616. In another embodiment, for example, the communication device 400 selects an 80 MHz bandwidth in an upper frequency range of the 5 GHz band (e.g., 5735-5815 MHz) for the first communication channel 608 and selects a 20 MHz bandwidth in a lower frequency range of the 5 GHz band (e.g., 5190 MHz to 5210 MHz) for the second communication channel 616.

Figure 7:
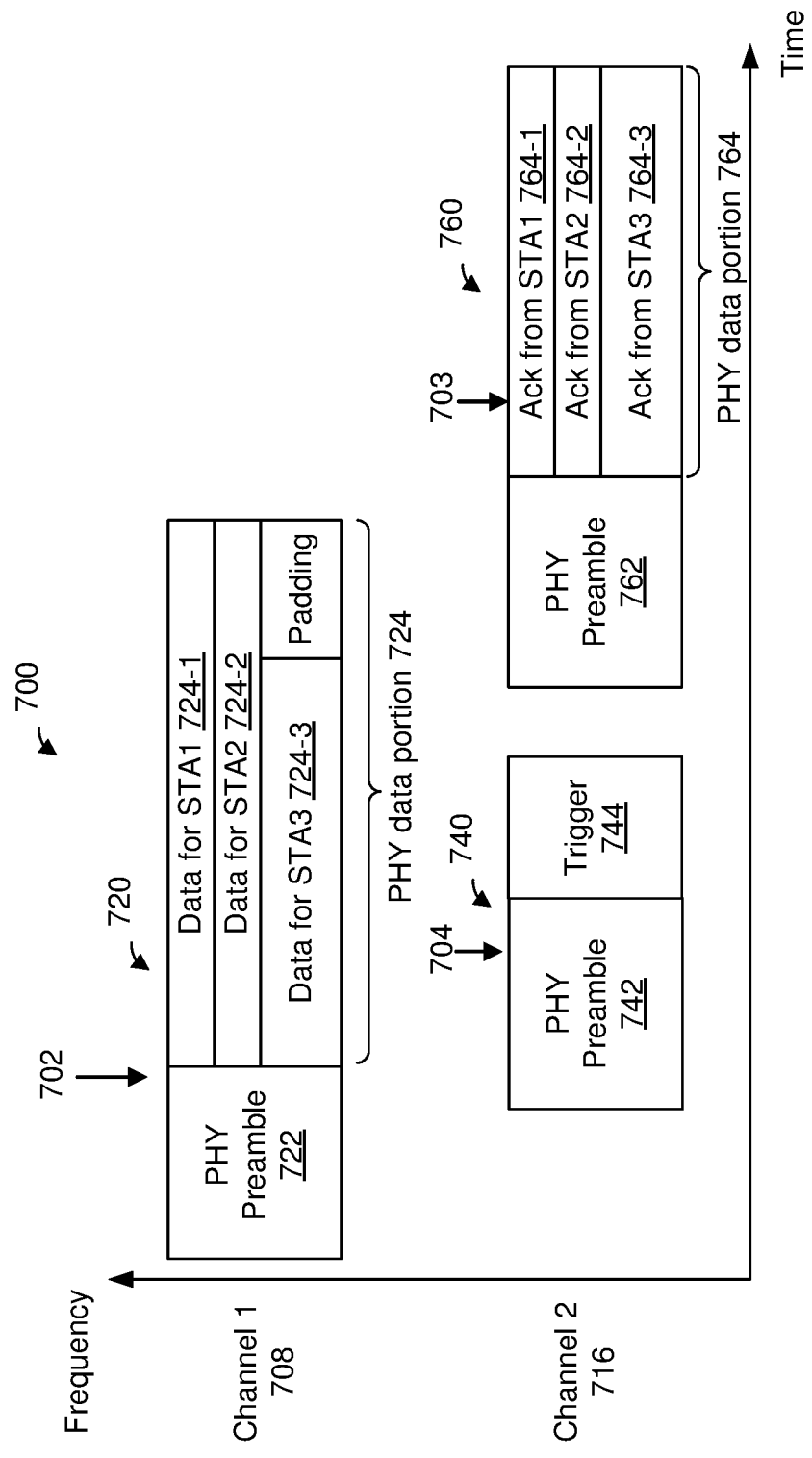
FIG. 7 is a diagram of another example signal transmission over aggregated communication channels using frequency division duplexing, according to another embodiment.

FIG. 7 is a diagram of an example MU transmission sequence 700 over an aggregated communication channel using frequency division duplexing, according to an embodiment. In the embodiment shown in FIG. 7, the transmission sequence 700 includes transmissions 702, 703, and 704, where the transmissions 702 and 704 are downlink transmissions (e.g., from the AP 114 to one or more client stations 154 referred to as STA1, STA2, and STA3) and the transmission 703 is an uplink transmission (e.g., from the client stations 154 to the AP 114). In this embodiment, the first communication channel 708 of the aggregated communication channels is designated for downlink traffic and the second communication channel 716 of the aggregated communication channels is designated for uplink traffic and optionally, triggers for the uplink traffic. The communication channels 708 and 716 are similar to the communication channels 508 and 516 described above with respect to FIG. 5. Accordingly, the communication channels 708 and 716 are in different RF bands (e.g., 2 GHz, 5 GHz, 6 GHz, etc.), in various embodiments.

In an embodiment, the transmission sequence 700 is generated and transmitted by the network interface device 122 (FIG. 1) to a plurality of client stations 154. In another embodiment, the transmission sequence 700 is generated and transmitted by the network interface device 162 (FIG. 1) to a plurality of other client stations 154 and optionally the AP 114.

In the embodiment shown in FIG. 7, the downlink transmission 702 includes a first RF signal 720 having a PHY preamble 722 and PHY data portion 724 in a first communication channel 708, the downlink transmission 704 includes a second RF signal 740 having a PHY preamble 742 and PHY data portion 744 in a second communication channel 716, and the uplink transmission 703 includes a third RF signal 760 having a PHY preamble 762 and PHY data portion 764 in the second communication channel 716. In an embodiment, the PHY data portion 724 corresponds to a downlink MPDU and the PHY data portion 764 corresponds to an acknowledgment of the downlink MPDU, while the PHY data portion 744 corresponds to a trigger frame that triggers the acknowledgment.

In various embodiments, the first communication channel 708 and the second communication channel 716 are similar to the first communication channels 508 and 608 and the second communication channels 516 and 616, respectively, as described above with reference to FIG. 5 and FIG. 6. In an embodiment, for example, the first communication channel 708 is designated for downlink traffic and the second communication channel 716 is designated for uplink traffic. In another embodiment, the first communication channel 708 is designated for forward traffic and the second communication channel 716 is designated for reverse traffic.

The PHY preambles 722, 742, and 762 are similar to the PHY preamble 520. In an embodiment in which the first communication channel 708 comprises multiple component channels, at least a portion of the PHY preamble 722 (e.g., a legacy portion) is generated by generating a field corresponding to one component channel and duplicating the field over one or more other component channels corresponding to the first communication channel 708. In an embodiment in which the second communication channel 716 comprises multiple component channels, at least a portion of the PHY preamble 742 or 762 (e.g., a legacy portion) is generated by generating a field corresponding to one component channel and duplicating the field over one or more other component channels corresponding to the second communication channel 716.

In various embodiments, the first communication channel 708 and the second communication channel 716 are in different RF bands or are co-located in a same RF band. In an embodiment, the RF band(s) correspond to the 2 GHz band, the 5 GHz band, and the 6 GHz bands, as described above. The first communication channel 708 and the second communication channel 716 may each be comprised of one or more component channels. In an embodiment, a frequency bandwidth of the first communication channel 708 (i.e., a frequency bandwidth of the first RF signal 720) is different than a frequency bandwidth of the second communication channel 716 (i.e., a frequency bandwidth of the second RF signal 740 and third RF signal 760). In another embodiment, the frequency bandwidth of the first communication channel 708 is the same as the frequency bandwidth of the second communication channel 716.

In an embodiment, the first communication channel 708 and the second communication channel 716 are separated in frequency. For example, a gap Δf in frequency exists between the first communication channel 708 and the second communication channel 716. In various embodiments, the gap Δf is at least 500 kHz, at least 1 MHz, at least 5 MHz, at least 20 MHz, etc.

In some embodiments, the transmission sequence 700 utilizes MU-MIMO, for example, the first RF signal 720 is transmitted via a first number of spatial streams, and the second RF signal 740 and third RF signal 760 are transmitted via a second number of spatial streams that is different than the first number of spatial streams. In one such embodiment, the PHY preamble 722 and the PHY preambles 742 and 762 comprise a same number of LTFs even when the first RF signal 720 is transmitted via a first number of spatial streams and the second and third RF signals 740 and 760 are transmitted via a second number of spatial streams that is different than the first number of spatial streams. In an embodiment, the same number of LTFs correspond to one of the first RF signal 720 and the second and third RF signals 740 and 760 with the larger number of spatial streams. In other embodiments, the first RF signal 720 and the second and third RF signals 740 and 760 are transmitted via a same number of spatial streams. In an embodiment, at least a PHY payload portion 724 and at least a PHY data payload 764 employ different encoding schemes and/or modulation schemes.

In some embodiments, the transmission sequence 700 utilizes OFDMA, for example, the PHY payload portion 724 includes respective frequency multiplexed data for respective client stations 154. Individual data within the data portion 724 are transmitted to corresponding client stations 154 in corresponding allocated RUs 724-1, 724-2, and 724-3. Individual data within the data portion 764 are transmitted from the corresponding client stations 154 in corresponding allocated RUs 764-1, 764-2, and 764-3. In various embodiments, some or all of RUs 724/764 use different encoding schemes and/or modulation schemes. As an example, the RU 764-1 and the RU 764-2 are generated using different MCSs and/or different numbers of spatial/ space-time streams, etc.

In various embodiments, the communication device 400 (FIG. 4A) is configured to generate at least a portion of the transmission sequence 700 and to receive at least a portion of the transmission sequence 700. In an embodiment, for example, the communication device 400 transmits the RF signals 720 and 740 and receives RF signal 760. In another embodiment, the communication device 400 receives the RF signals 720 and 740 and transmits the RF signal 760.

In some embodiments, the communication device 450 (FIG. 4A) is configured to generate at least a portion of the transmission sequence 700 and to receive at least a portion of the transmission sequence 700. In an embodiment, for example, the communication device 450 transmits the RF signals 720 and 740 and receives RF signal 760. In another embodiment, the communication device 450 receives the RF signals 720 and 740 and transmits the RF signal 760.

The multiple communication channels that corresponding to the multiple radios are sometimes referred to herein as "the radio channels" for ease of explanation. In some embodiments, one of the component channels across the multiple radio channels is designated as a primary channel. The one radio channel that includes the designated primary channel is sometimes referred to herein as "the primary radio channel". Other component channels across the multiple radio channels that are not a primary channel are sometimes referred to herein as "secondary channels".

Figure 8B:
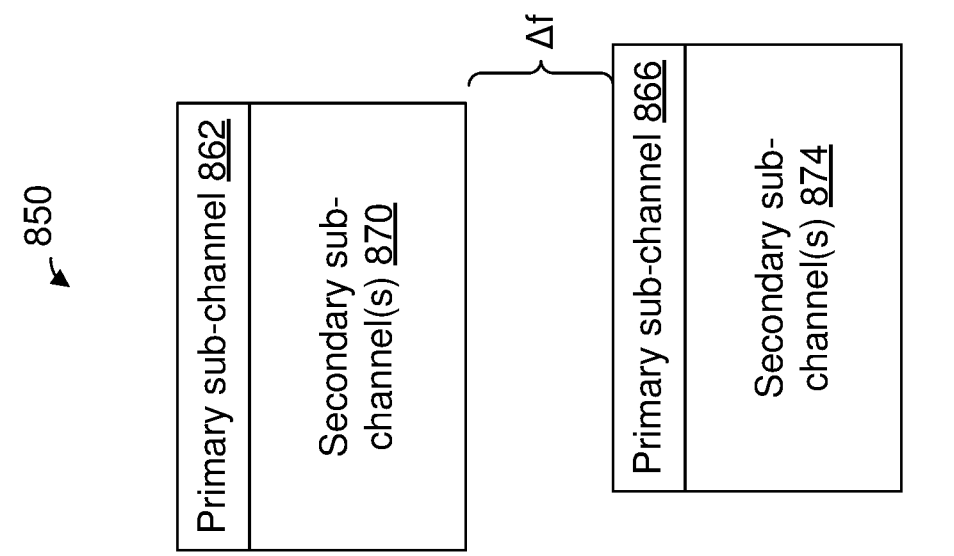
FIG. 8B is a diagram of another example channelization scheme corresponding to multiple channels, according to another embodiment.
Figure 8A:
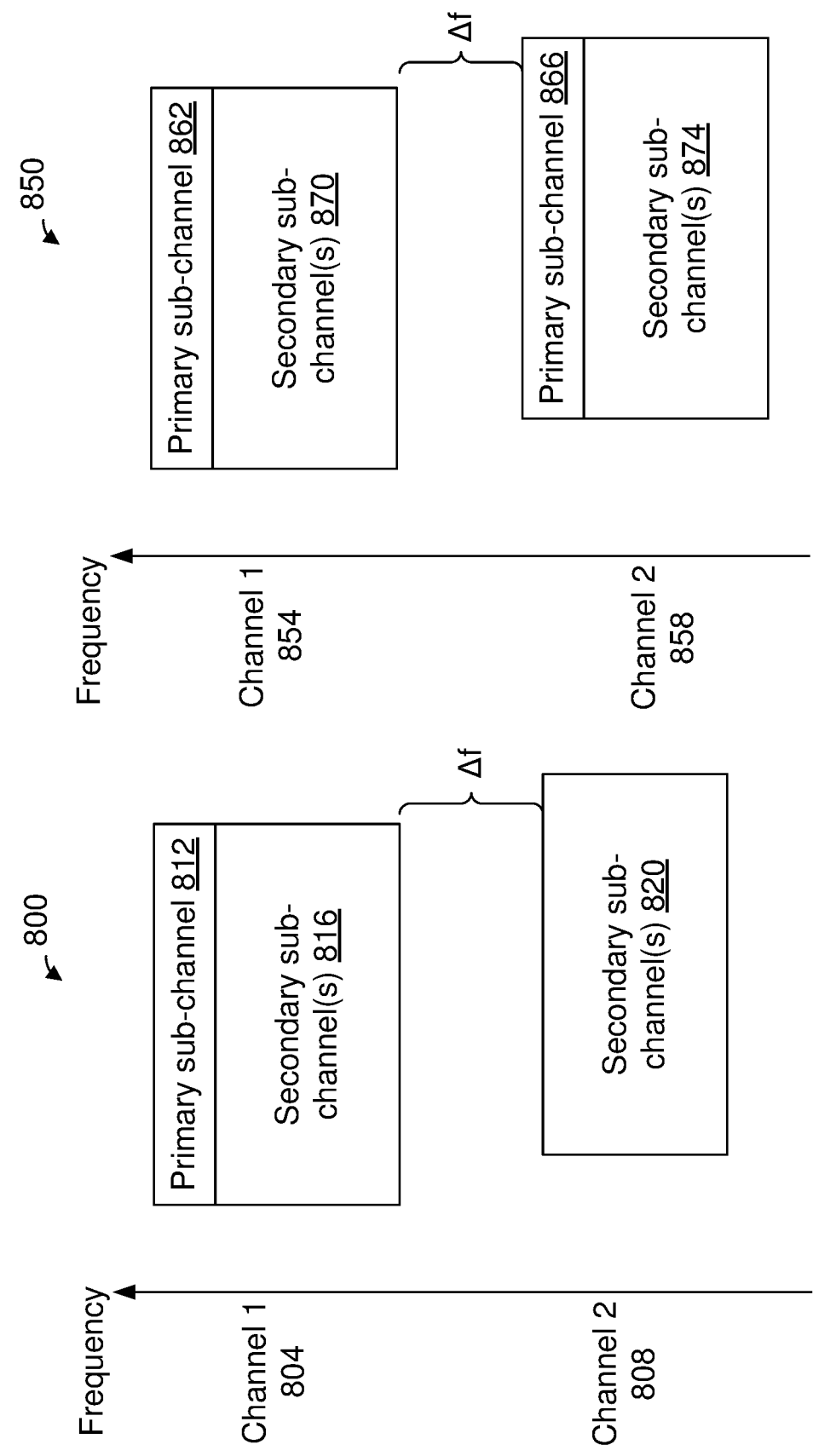
FIG. 8A is a diagram of an example channelization scheme corresponding to multiple channels, according to an embodiment.

FIG. 8A is a diagram of an example channelization scheme 800 corresponding to multi-channel operation, according to an embodiment. In an embodiment, the channelization scheme 800 is employed for signal transmissions such as described above in reference to FIGS. 5-7, and/or for other transmissions across multiple radio channels.

The channelization scheme 800 illustrates a first communication channel 804 (also referred to herein as "the first radio channel 804") aggregated with a second communication channel 808 (also referred to herein as "the second radio channel 808"). In various embodiments, the radio channels 804 and 808 correspond to communication channels 508 and 516, communication channels 608 and 616, or communication channels 708 and 716, as described above in reference to FIG. 5, FIG. 6, and FIG. 7, respectively. In other embodiments, the radio channels 804 and 808 correspond to other suitable radio channels.

The first radio channel 804 comprises one or more component channels, and the second radio channel 808 comprises one or more component channels. In the channelization scheme 800, a single component channel 812 in the radio channel 804 is designated as the primary channel (e.g., for management frames and control frames). The remaining one or more component channels 816 (if any) in the first radio channel 804 are designated as secondary channels 816. Similarly, the one or more component channels 820 in the second radio channel 808 are designated as secondary channels. In an embodiment, the first radio channel 804 and the second radio channel 808 are separated in frequency as described above.

In an embodiment in which the first radio channel 804 and the second radio channel 808 correspond to different RF bands, and in which one or more client stations 154 are only capable of operating in only one of the RF bands, the AP 114 designates the primary channel to be in the one radio channel 804/808 that corresponds to the one RF band in which the one or more client stations 154 are only capable of operating. In an embodiment where the first radio channel 804 is in the 5 GHz band and the second radio channel 808 is in the 6 GHz band, the AP 114 designates the primary channel to be in the 5 GHz band when a legacy WLAN communication device (i.e., a single band station such as an 802.11ac client station or other device that does not support the 6 GHz band). In an embodiment in which the radio channel 804 and the radio channel 808 correspond to different RF bands, and in which one or more client stations 154 are only capable of operating in only one of the RF bands, the AP 114 is not permitted to designate the primary channel to be in a radio channel 804/808 that does not correspond to the one RF band in which the one or more client stations 154 are only capable of operating.

In some embodiments, the WLAN 110 includes i) an AP 114 that is a multi-band communication device and communicates over the first radio channel 804 and second radio channel 808, ii) a first client station 154 that is multi-band communication device and communicates over the first radio channel 804 and the second radio channel 808, and iii) a second client station 154 that is a single-band communication device (i.e., a legacy WLAN communication device) and communicates only over the first radio channel 804. In an embodiment, the AP 114 designates i) the first radio channel 804 as a downlink channel and the second radio channel 808 as an uplink channel for the first multi-band communication device, and ii) the first radio channel 804 as a downlink and uplink channel for the single-band communication device. In another embodiment, the AP 114 designates i) the first radio channel 804 as a forward channel and the second radio channel 808 as a reverse channel for the first multi-band communication device, and ii) the first radio channel 804 as a forward and reverse channel for the single-band communication device.

FIG. 8B is a diagram of another example channelization scheme 850 corresponding to multi-channel operation, according to another embodiment. In an embodiment, the channelization scheme 850 is employed for signal transmissions as described above in reference to FIGS. 5-7. The channelization scheme 850 includes a first communication channel 854 (also referred to herein as "the first radio channel 854") aggregated with a second communication channel 858 (also referred to herein as "the second radio channel 858"). In various embodiments, the radio channels 854 and 858 correspond to communication channels 508 and 516, communication channels 608 and 616, or communication channels 708 and 716, as described above in reference to FIG. 5, FIG. 6, and FIG. 7, respectively. In other embodiments, the radio channels 854 and 858 correspond to other suitable radio channels.

The first radio channel 854 comprises one or more component channels, and the second radio channel 858 comprises one or more component channels. For the channelization scheme 850, the AP 114 designates respective primary channels for both radio channels 854 and 858. For example, a channel 862 in the first radio channel 854 is designated as a primary channel corresponding to the first radio channel 854 (sometimes referred to herein as "the first primary channel 862"), and a component channel 866 in the second radio channel 858 is designated as a primary channel corresponding to second radio channel 858 (sometimes referred to herein as "the second primary channel 866"). The remaining one or more component channels 870 (if any) in the first radio channel 854 are designated as secondary channels. Similarly, the one or more component channels 874 in the second radio channel 858 are designated as secondary channels. In an embodiment, the first radio channel 854 and the second radio channel 858 are separated in frequency as described above.

In an embodiment, the AP 114 operating according to the channelization scheme 850 transmits beacon frames in both of the primary channels 862 and 866. In an embodiment, the beacon frames transmitted in both of the primary channels 862 and 866 are the same beacon frame.

In some embodiments, at least some communication devices (e.g., client stations 154) may operate according to a legacy communication protocol that does not define more than one primary channel for transmission over aggregated channels. In at least some such embodiments, the legacy communication devices may be allocated for operation in only a single communication channel (e.g., one of the communication channels 854 and 858). Alternatively, the legacy communication devices may be configured for independent and asynchronous operation in both communication channels 854 and 858, such as DBC operation described above.

In some embodiments, the WLAN 110 includes i) an AP 114 that is a multi-band communication device and communicates over the first radio channel 854 and second radio channel 858, ii) a first client station 154 that is multi-band communication device and communicates over the first radio channel 854 and the second radio channel 858, iii) a second client station 154 that is a single-band communication device (i.e., a legacy WLAN communication device) and communicates only over the first radio channel 854, and iv) a third client station 154 that is a single-band communication device and communicates only over the second radio channel 858. In an embodiment, the AP 114 designates i) the first radio channel 854 as a downlink channel and the second radio channel 858 as an uplink channel for the first, multi-band client station, and ii) the first radio channel 854 as a downlink and uplink channel for the second, single-band communication device, and iii) the second radio channel 858 as a downlink and uplink channel for the third, single-band communication device. In another embodiment, the AP 114 designates i) the first radio channel 854 as a forward channel and the second radio channel 858 as a reverse channel for the first multi-band communication device, ii) the first radio channel 854 as a forward and reverse channel for the second, single-band communication device, and iii) the second radio channel 858 as a forward and reverse channel for the third, single-band communication device.

Figure 9:
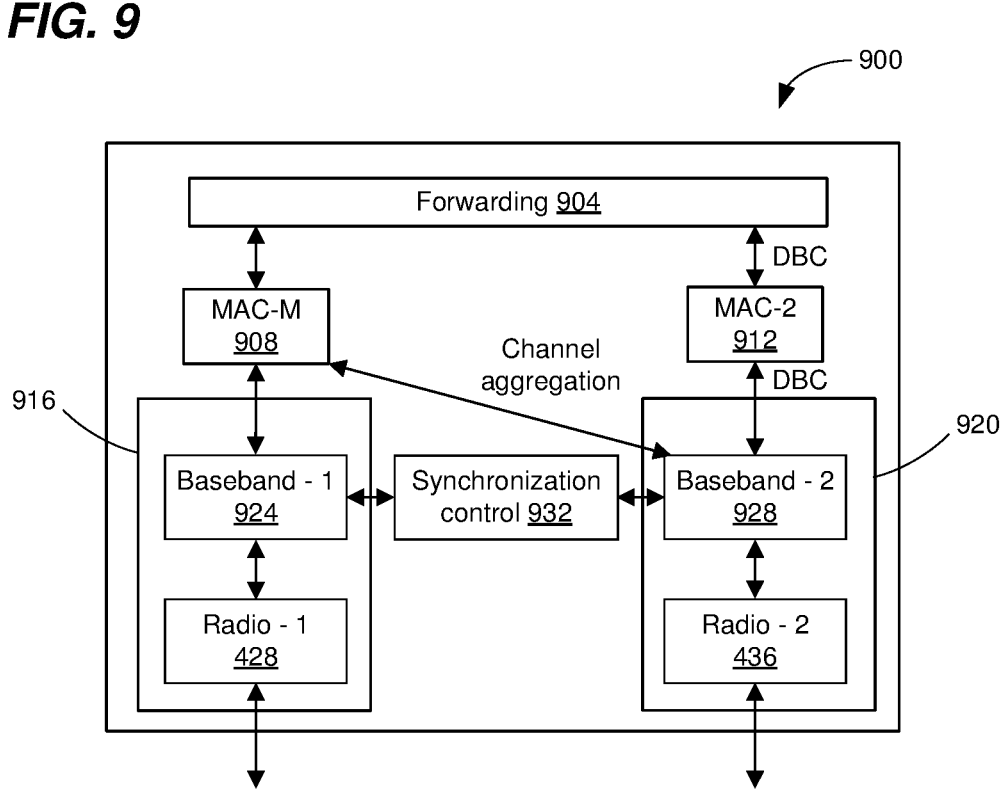
FIG. 9 is a diagram of another example system architecture corresponding to a communication device configured for multi-channel operation, according to another embodiment.

FIG. 9 is a diagram of an example system architecture corresponding to a communication device 900 configured for different modes multi-channel operating modes. In other words, the communication device 900 provides a network interface device configured to implement i) a DBC mode as described above with respect to FIG. 3, ii) a synchronous multi-channel mode as described above with respect to FIG. 4A, and/or iii) an asynchronous multi-channel mode as described above with respect to FIG. 5, FIG. 6, FIG. 7, FIG. 8A, and FIG. 8B. In an embodiment, the communication device 900 is utilized in the AP 114 or the client station 154. In an embodiment, the communication device 900 is configured to selectively transmit and/or receive signals described above with reference to FIGS. 5-7. In an embodiment, the communication device 900 is further configured for selective DBC operation as described above with reference to FIG. 3.

The communication device 900 is similar to the communication device 400 as described above with respect to FIG. 4A, and like-numbered elements not described in detail for purpose of brevity. The communication device 900 includes a packet forwarding processor 904 configured to forward packets among the two communication channels and a WAN connection (not shown). The communication device 900 also includes a master MAC processor 908 (MAC-M), a second MAC processor 912 (MAC-2), a first PHY processor 916, and a second PHY processor 920. The master MAC processor 908 is coupled to both the first PHY processor 916 and the second PHY processor 920. The second MAC processor 912 is coupled to the second PHY processor 920. The master MAC processor 908 exchanges frame data with the first PHY processor 916, and the second MAC processor 912 exchanges frame data with the second PHY processor 920. In the multi-channel modes, the master MAC processor 908 also exchanges frame data with the first PHY processor 916 while the second MAC processor 912 is idle.

In an embodiment, master MAC processor 908 and the second MAC processor 912 correspond to the MAC processor 126 of FIG. 1. In another embodiment, the master MAC processor 908 and the second MAC processor 912 correspond to the MAC processor 166 of FIG. 1. In an embodiment, the first PHY processor 916 and the second PHY processor 920 correspond to the PHY processor 130 of FIG. 1. In another embodiment, the first PHY processor 916 and the second PHY processor 920 correspond to the PHY processor 170 of FIG. 1.

The communication device 900 also includes synchronization control circuitry 932.

In the multi-channel modes, the forwarding processor 904 exchanges data only with the master MAC processor 908; and the master MAC processor 908, the first PHY processor 916, the second PHY processor 920, and the synchronization control circuitry 932 operate in a manner similar to communication device 400 of FIG. 4A. Also in the multi-channel modes, the second PHY processor 920 exchanges frame data with the master MAC processor 908 while the second MAC processor 912 is idle.

On the other hand, in the DBC mode, the forwarding processor 904 exchanges data with both the master MAC processor 908 and the second MAC processor 912; and the master MAC processor 908, the second MAC processor 912, the first PHY processor 916, and the second PHY processor 920, operate in a manner similar to communication device 300 of FIG. 3. Also in the DBC mode, the synchronization control circuitry 932 is idle.

The communication device 900 is configured to selectively switch between the multi-channel modes and the DBC mode. In an embodiment, the choice of a particular mode of operation is determined based on the volume of traffic and/or a number of client station 154 being serviced by the AP 114. In an embodiment, if a large number of client stations 154 that can operate on both the first communication channel and the second communication channel are present in the WLAN 110, DBC operation is preferred. In an embodiment, if a large number of client stations 154 are present on a single communication channel, multi-channel operation is preferred. In an embodiment, the AP 114 may prefer multi-channel operation when the AP 114 is servicing a small number of client station 154 with a high throughput.

Figure 10:
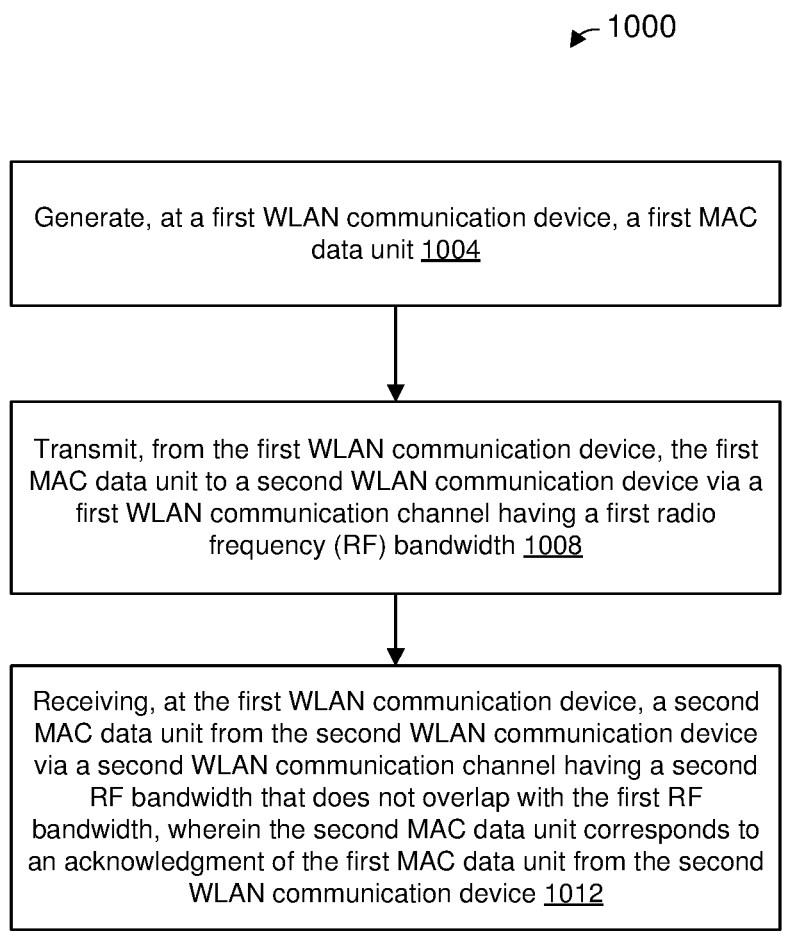
FIG. 10 is a flow diagram of an example method for wireless local area network (WLAN) communication, according to an embodiment.

FIG. 10 is a flow diagram of an example method 1000 for wireless local area network (WLAN) communication by a first WLAN communication device, according to an embodiment. In some embodiments, the AP 114 of FIG. 1 is configured to implement the method 1000 (in other words, the AP 114 is the first WLAN communication device). In an embodiment, the method 1000 is implemented by the AP 114 by utilizing the communication device 400, the communication device 450, or the communication device 900 as described above with reference to FIGS. 4A-B and 9. The method 1000 is described, however, in the context of the AP 114 merely for explanatory purposes and, in other embodiments, the method 1000 is implemented by another suitable device such as the client station 154. In various embodiments, the method 1000 is utilized to generate signals corresponding to those described above in reference to FIGS. 5-7. In various embodiments, the method 1000 is utilized with channelizations such as described above in reference to FIGS. 8A-B.

At block 1004, the AP 114 generates a first media access control (MAC) data unit. In an embodiment, the MAC data unit is an MPDU, A-MPDU, MMPDU, or other suitable MAC data unit. In an embodiment, the first MAC data unit corresponds to the PHY data portion 624 (FIG. 6) and includes, for example, an MPDU intended for a client station 154. In another embodiment, the first MAC data unit corresponds to the PHY data portion 724-1, 724-2, or 724-3 (FIG. 7).

At block 1008, the AP 114 transmits the first MAC data unit to a second WLAN communication device via a first WLAN communication channel having a first radio frequency (RF) bandwidth. In an embodiment, the second WLAN communication is the client station 154 to which the first MAC data unit is transmitted. In an embodiment, the first WLAN communication channel corresponds to the communication channel 608. In another embodiment, the communication channel corresponds to the communication channel 708. In an embodiment, the first RF bandwidth is a bandwidth within the 5 GHz band, the 6 GHz band, or other suitable band.

At block 1012, the AP 114 receives a second MAC data unit from the second WLAN communication device via a second WLAN communication channel having a second RF bandwidth that does not overlap the first RF bandwidth, where the second MAC data unit corresponds to an acknowledgment of the first MAC data unit from the second WLAN communication device. In an embodiment, for example, the AP 114 receives the acknowledgment 644 via the second communication channel 616 (FIG. 6). In another embodiment, the AP 114 receives the acknowledgment 764-1, 764-2, or 764-3 via the second communication channel 716.

In an embodiment, generating the first MAC data unit includes providing, by a single MAC layer processor implemented on one or more integrated circuit (IC) devices of the first WLAN communication device, the first MAC data unit to one or more baseband signal processors of the first WLAN communication device, wherein the one or more baseband signal processors are implemented on the one or more IC devices, and generating, at the one or more baseband signal processors, a first baseband signal that corresponds to the first MAC data unit. In an embodiment, for example, the single MAC layer processor corresponds to the MAC processor 408 (FIG. 4A), MAC processor 458 (FIG. 4B), or MAC processor 908 (FIG. 9) and the first baseband signal processor corresponds to the baseband processor 424 or 432 (FIG. 4A), the baseband processor 474 (FIG. 4B), or the baseband processor 924 or 928 (FIG. 9).

In an embodiment, transmitting the first MAC data unit comprises transmitting, by a first RF radio of a plurality of RF radios of the first WLAN communication device and to the second WLAN communication device via the first WLAN communication channel, a first RF signal that corresponds to the first baseband signal and occupies the first RF bandwidth. In an embodiment, for example, the RF radio 428 transmits the first RF signal 620 (FIG. 6) or the first RF signal 720 (FIG. 7).

In some embodiments, receiving the second MAC data unit includes receiving, at a second RF radio of the plurality of RF radios and from the second WLAN communication device via the second WLAN communication channel, a second RF signal that corresponds to the second MAC data unit and occupies the second RF bandwidth. In some such embodiments, the method 1000 further includes generating, by the one or more baseband signal processors, a second baseband signal that corresponds to the second MAC data unit, and generating, by the one or more baseband signal processors, the second MAC data unit using the second baseband signal. In an embodiment, for example, the AP 114 receives the RF signal 640 at the RF radio 436.

In an embodiment, the method 1000 further includes: providing, by the single MAC layer processor, a third MAC data unit to the one or more baseband signal processors; generating, at the one or more baseband signal processors, a third baseband signal that corresponds to the third MAC data unit; and transmitting, by the first RF radio and to the second WLAN communication device via the first WLAN communication channel, a third RF signal that corresponds to the third baseband signal. In an embodiment, the first RF radio transmits at least a portion of the third RF signal simultaneously with reception by the second RF radio of at least a portion of the second RF signal. In an embodiment, the third MAC data unit corresponds to the PHY data portion 664 and the third RF signal corresponds to the RF signal 660.

In an embodiment, the first WLAN communication channel includes a primary channel and the method 1000 further includes: providing, by the single MAC layer processor, a third MAC data unit to the one or more baseband signal processors; generating, at the one or more baseband signal processors, a third baseband signal that corresponds to the third MAC data unit; transmitting, by the first RF radio and to a legacy WLAN communication device via the first WLAN communication channel, a third RF signal that corresponds to the third baseband signal; receiving, at the first RF radio and from the legacy WLAN communication device via the first WLAN communication channel, a fourth RF signal that corresponds to an acknowledgment of the third MAC data unit; generating, by the one or more baseband signal processors, a fourth baseband signal that corresponds to the acknowledgment of the third MAC data unit; and generating, by the one or more baseband signal processors, a fourth MAC data unit that corresponds to the acknowledgment of the third MAC data unit. In an embodiment, for example, the primary channel corresponds to the primary channel 812 and the AP 114 generates and transmits a MAC data unit to a legacy WLAN communication device, as described above with respect to FIG. 8A.

In some embodiments, the first RF bandwidth and first WLAN communication channel are designated for MAC data units that include forward traffic, and the second RF bandwidth and the second WLAN communication channel are designated for MAC data units that include reverse traffic that acknowledges the forward traffic. In an embodiment, the forward traffic includes multi-user, multiple input multiple output (MU-MIMO) forward traffic transmitted to a plurality of WLAN communication device that includes the second WLAN communication devices, and the reverse traffic is triggered by a trigger MAC data unit transmitted via the second WLAN communication channel to the plurality of WLAN communication devices. In an embodiment, the forward traffic includes orthogonal frequency division multiple access (OFDMA) forward traffic to a plurality of WLAN communication devices that includes the second WLAN communication device, and the reverse traffic is triggered by a trigger MAC data unit transmitted via the second WLAN communication channel to the plurality of WLAN communication devices.

In some embodiments, the first RF bandwidth and first WLAN communication channel are designated for MAC data units that include downlink traffic transmitted from the first WLAN communication device, wherein the first WLAN communication device is a WLAN access point, and the second RF bandwidth and the second WLAN communication channel are designated for MAC data units that include uplink traffic transmitted to the WLAN access point. In one such embodiment, the downlink traffic includes MU-MIMO traffic to a plurality of WLAN communication devices that includes the second WLAN communication device, and the uplink traffic is triggered by a trigger MAC data unit transmitted via the second WLAN communication channel to the plurality of WLAN communication devices. In another such embodiment, the downlink traffic includes OFDMA data units transmitted to a plurality of WLAN communication devices that includes the second WLAN communication device, and the uplink traffic includes OFDMA data units that are transmitted by the plurality of WLAN communication devices and triggered by a trigger MAC data unit transmitted via the second WLAN communication channel to the plurality of WLAN communication devices.

In an embodiment, the first and second RF bandwidths have different respective bandwidths and one of the first and second RF bandwidths is larger than another of the first and second RF bandwidths. In an embodiment, for example, the respective first and second RF bandwidths are 80 MHz and 20 MHz, 160 MHz and 20 MHz, 320 MHz and 40 MHz, or other suitable bandwidths, as described above with respect to FIG. 5 and FIG. 6.

In an embodiment, the first RF bandwidth and the second RF bandwidth are separated by at least 160 MHz.

Figure 11:
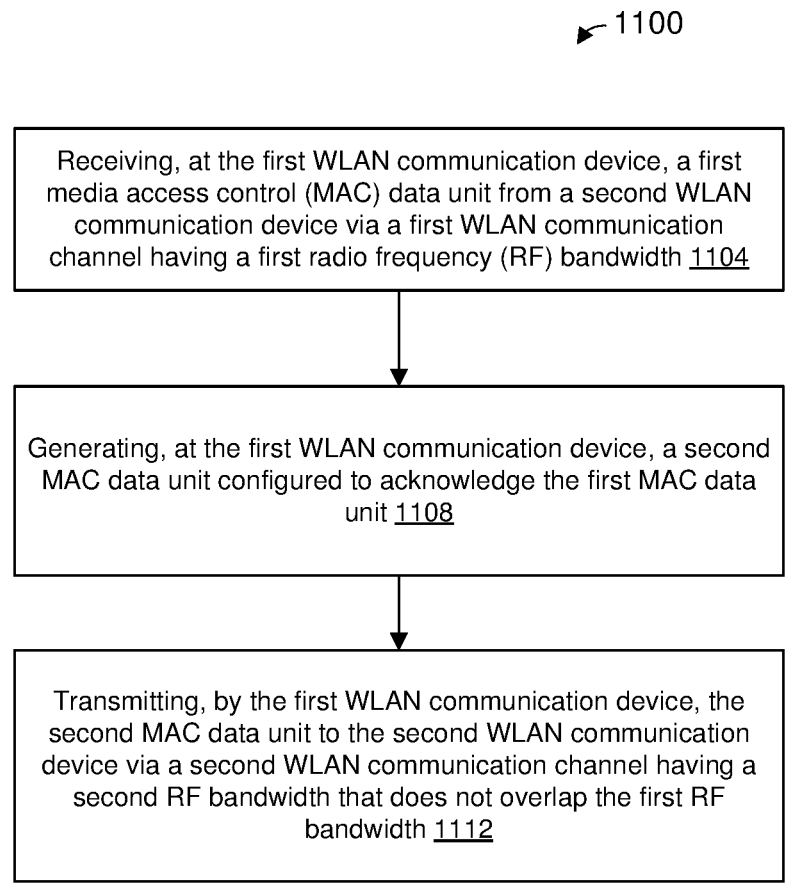
FIG. 11 is a flow diagram of another example method for WLAN communication, according to an embodiment.

FIG. 11 is a flow diagram of an example method 1100 for wireless local area network (WLAN) communication by a first WLAN communication device, according to an embodiment. In some embodiments, the client station 154 of FIG. 1 is configured to implement the method 1100. In an embodiment, the method 1100 is implemented by the client station 154 by utilizing the communication device 400, the communication device 450, or the communication device 900 as described above with reference to FIGS. 4A-B and 9. The method 1100 is described, however, in the context of the client station 154 merely for explanatory purposes and, in other embodiments, the method 1100 is implemented by another suitable device such as the AP 114. In various embodiments, the method 1100 is utilized to receive and process signals corresponding to those described above in reference to FIGS. 5-7. In various embodiments, the method 1100 is utilized with channelizations such as described above in reference to FIGS. 8A-B.

At block 1104, the client station 154 (as a first WLAN communication device) receives a first MAC data unit from a second WLAN communication device via a first WLAN communication channel having a first radio frequency (RF) bandwidth. In an embodiment, the MAC data unit is an MPDU, A-MPDU, MMPDU, or other suitable MAC data unit. In an embodiment, the first MAC data unit corresponds to the PHY data portion 624 (FIG. 6) and includes, for example, an MPDU intended for the client station 154. In another embodiment, the first MAC data unit corresponds to the PHY data portion 724-1, 724-2, or 724-3 (FIG. 7).

At block 1108, the client station 154 generates a second MAC data unit configured to acknowledge the first MAC data unit. In an embodiment, for example, the client station generates the acknowledgment 644. In another embodiment, the client station 154 generates the acknowledgment 764-1, 764-2, or 764-3.

At block 1112, the client station 154 transmits the second MAC data unit to the second WLAN communication device via a second WLAN communication channel having a second RF bandwidth that does not overlap the first RF bandwidth. In an embodiment, for example, the client station 154 transmits the acknowledgment 644 as the RF signal 640.

In an embodiment, receiving the first MAC data unit includes receiving, at a first RF radio of a plurality of RF radios of the first WLAN communication device and from the second WLAN communication device via the first WLAN communication channel, a first RF signal that corresponds to the first MAC data unit and occupies the first RF bandwidth, generating, by one or more baseband signal processors implemented on one or more integrated circuit (IC) devices of the first WLAN communication device, a first baseband signal that corresponds to the first MAC data unit, and generating, by the one or more baseband signal processors, the first MAC data unit using the first baseband signal. In an embodiment, the first RF radio corresponds to the RF radio 428 and receives the RF signal 620 from the AP 114.

In an embodiment, generating the second MAC data unit includes providing, by a single MAC layer processor implemented on the one or more IC devices, the second MAC data unit to the one or more baseband signal processors, and generating, at the one or more baseband signal processors, a second baseband signal that corresponds to the second MAC data unit. In an embodiment, for example, the MAC layer processor is the MAC processor 408 or 474 and the baseband signal processor is the baseband processor 424 or 432 (FIG. 4A or 4B).

In an embodiment, transmitting the second MAC data unit includes transmitting, by a second RF radio of the plurality of RF radios and to the second WLAN communication device via the second WLAN communication channel, a second RF signal that corresponds to the second baseband signal and occupies the second RF bandwidth. In an embodiment, the second RF radio is the RF radio 436 that transmits the RF signal 640.

In an embodiment, the method 1100 further includes providing, by the single MAC layer processor, a third MAC data unit to the one or more baseband signal processors; generating, at the one or more baseband signal processors, a third baseband signal that corresponds to the third MAC data unit; and transmitting, by the second RF radio and to the second WLAN communication device via the first WLAN communication channel, a third RF signal that corresponds to the third baseband signal; wherein the second RF radio transmits at least a portion of the third RF signal simultaneously with reception by the first RF radio of at least a portion of the first RF signal. In an embodiment, for example, the client station 154 receives the RF signal 660 and simultaneously transmits the RF signal 640.

In an embodiment, the first WLAN communication channel includes a primary channel, the method 1100 further including: providing, by the single MAC layer processor, a third MAC data unit to the one or more baseband signal processors; generating, at the one or more baseband signal processors, a third baseband signal that corresponds to the third MAC data unit; transmitting, by the first RF radio and to a legacy WLAN communication device via the first WLAN communication channel, a third RF signal that corresponds to the third baseband signal; receiving, at the first RF radio and from the legacy WLAN communication device via the first WLAN communication channel, a fourth RF signal that corresponds to an acknowledgment of the third MAC data unit; generating, by the one or more baseband signal processors, a fourth baseband signal that corresponds to the acknowledgment of the third MAC data unit; generating, by the one or more baseband signal processors, a fourth MAC data unit that corresponds to the acknowledgment of the third MAC data unit.

In an embodiment, the first RF bandwidth and first WLAN communication channel are designated for MAC data units that include forward traffic, and the second RF bandwidth and the second WLAN communication channel are designated for MAC data units that include reverse traffic that acknowledges the forward traffic.

In an embodiment, the forward traffic includes multi-user, multiple input multiple output (MU-MIMO) forward traffic transmitted to a plurality of WLAN communication device that includes the second WLAN communication devices, the reverse traffic is triggered by a trigger MAC data unit transmitted via the second WLAN communication channel to the plurality of WLAN communication devices.

In an embodiment, the forward traffic includes orthogonal frequency division multiple access (OFDMA) forward traffic to a plurality of WLAN communication devices that includes the second WLAN communication device, and the reverse traffic is triggered by a trigger MAC data unit transmitted via the second WLAN communication channel to the plurality of WLAN communication devices.

In an embodiment, the first RF bandwidth and first WLAN communication channel are designated for MAC data units that include downlink traffic transmitted to the first WLAN communication device, wherein the first WLAN communication device is a WLAN client station. In an embodiment, the second RF bandwidth and the second WLAN communication channel are designated for MAC data units that include uplink traffic transmitted from the WLAN client station.

In an embodiment, the downlink traffic includes MU-MIMO traffic to a plurality of WLAN communication devices that includes the first WLAN communication device, and the uplink traffic is triggered by a trigger MAC data unit transmitted via the second WLAN communication channel to the plurality of WLAN communication devices.

In an embodiment, the downlink traffic includes OFDMA data units transmitted to a plurality of WLAN communication devices that includes the first WLAN communication device, and the uplink traffic includes OFDMA data units that are transmitted by the plurality of WLAN communication devices and triggered by a trigger MAC data unit transmitted via the second WLAN communication channel to the plurality of WLAN communication devices.

In an embodiment, the first and second RF bandwidths have different respective bandwidths and one of the first and second RF bandwidths is larger than another of the first and second RF bandwidths.

In an embodiment, the first RF bandwidth and the second RF bandwidth are separated by at least 160 MHz.

Embodiment 1: A method for wireless local area network (WLAN) communication by a first WLAN communication device, the method comprising: generating, at the first WLAN communication device, a first media access control (MAC) data unit; transmitting, from the first WLAN communication device, the first MAC data unit to a second WLAN communication device via a first WLAN communication channel having a first radio frequency (RF) bandwidth; receiving, at the first WLAN communication device, a second MAC data unit from the second WLAN communication device via a second WLAN communication channel having a second RF bandwidth that does not overlap the first RF bandwidth, wherein the second MAC data unit corresponds to an acknowledgment of the first MAC data unit from the second WLAN communication device.

Embodiment 2: The method of embodiment 1, wherein: generating the first MAC data unit comprises providing, by a single MAC layer processor implemented on one or more integrated circuit (IC) devices of the first WLAN communication device, the first MAC data unit to one or more baseband signal processors of the first WLAN communication device, wherein the one or more baseband signal processors are implemented on the one or more IC devices, and generating, at the one or more baseband signal processors, a first baseband signal that corresponds to the first MAC data unit; transmitting the first MAC data unit comprises transmitting, by a first RF radio of a plurality of RF radios of the first WLAN communication device, to the second WLAN communication device via the first WLAN communication channel, a first RF signal that corresponds to the first baseband signal and occupies the first RF bandwidth; receiving the second MAC data unit comprises receiving, at a second RF radio of the plurality of RF radios and from the second WLAN communication device via the second WLAN communication channel, a second RF signal that corresponds to the second MAC data unit and occupies the second RF bandwidth, generating, by the one or more baseband signal processors, a second baseband signal that corresponds to the second MAC data unit, and generating, by the one or more baseband signal processors, the second MAC data unit using the second baseband signal.

Embodiment 3. The method of embodiment 2, further comprising: providing, by the single MAC layer processor, a third MAC data unit to the one or more baseband signal processors; generating, at the one or more baseband signal processors, a third baseband signal that corresponds to the third MAC data unit; transmitting, by the first RF radio and to the second WLAN communication device via the first WLAN communication channel, a third RF signal that corresponds to the third baseband signal; wherein the first RF radio transmits at least a portion of the third RF signal simultaneously with reception by the second RF radio of at least a portion of the second RF signal.

Embodiment 4. The method of embodiment 2, wherein the first WLAN communication channel includes a primary channel, the method further including:

providing, by the single MAC layer processor, a third MAC data unit to the one or more baseband signal processors; generating, at the one or more baseband signal processors, a third baseband signal that corresponds to the third MAC data unit; transmitting, by the first RF radio and to a legacy WLAN communication device via the first WLAN communication channel, a third RF signal that corresponds to the third baseband signal; receiving, at the first RF radio and from the legacy WLAN communication device via the first WLAN communication channel, a fourth RF signal that corresponds to an acknowledgment of the third MAC data unit; generating, by the one or more baseband signal processors, a fourth baseband signal that corresponds to the acknowledgment of the third MAC data unit; generating, by the one or more baseband signal processors, a fourth MAC data unit that corresponds to the acknowledgment of the third MAC data unit.

Embodiment 5. The method of embodiment 1, wherein: the first RF bandwidth and first WLAN communication channel are designated for MAC data units that include forward traffic; the second RF bandwidth and the second WLAN communication channel are designated for MAC data units that include reverse traffic that acknowledges the forward traffic.

Embodiment 6. The method of embodiment 5, wherein: the forward traffic includes multi-user, multiple input multiple output (MU-MIMO) forward traffic transmitted to a plurality of WLAN communication device that includes the second WLAN communication devices; and the reverse traffic is triggered by a trigger MAC data unit transmitted via the second WLAN communication channel to the plurality of WLAN communication devices.

Embodiment 7. The method of embodiment 5, wherein: the forward traffic includes orthogonal frequency division multiple access (OFDMA) forward traffic to a plurality of WLAN communication devices that includes the second WLAN communication device; and the reverse traffic is triggered by a trigger MAC data unit transmitted via the second WLAN communication channel to the plurality of WLAN communication devices.

Embodiment 8. The method of embodiment 1, wherein: the first RF bandwidth and first WLAN communication channel are designated for MAC data units that include downlink traffic transmitted from the first WLAN communication device, wherein the first WLAN communication device is a WLAN access point; the second RF bandwidth and the second WLAN communication channel are designated for MAC data units that include uplink traffic transmitted to the WLAN access point.

Embodiment 9. The method of embodiment 8, wherein: the downlink traffic includes MU-MIMO traffic to a plurality of WLAN communication devices that includes the second WLAN communication device; and the uplink traffic is triggered by a trigger MAC data unit transmitted via the second WLAN communication channel to the plurality of WLAN communication devices.

Embodiment 10. The method of embodiment 8, wherein: the downlink traffic includes OFDMA data units transmitted to a plurality of WLAN communication devices that includes the second WLAN communication device; and the uplink traffic includes OFDMA data units that are transmitted by the plurality of WLAN communication devices and triggered by a trigger MAC data unit transmitted via the second WLAN communication channel to the plurality of WLAN communication devices.

Embodiment 11. The method of embodiment 1, wherein the first and second RF bandwidths have different respective bandwidths and one of the first and second RF bandwidths is larger than another of the first and second RF bandwidths.

Embodiment 12. The method of embodiment 1, wherein the first RF bandwidth and the second RF bandwidth are separated by at least 160 MHz.

Embodiment 13. A method for wireless local area network (WLAN) communication by a first WLAN communication device, the method comprising: receiving, at the first WLAN communication device, a first media access control (MAC) data unit from a second WLAN communication device via a first WLAN communication channel having a first radio frequency (RF) bandwidth; generating, at the first WLAN communication device, a second MAC data unit configured to acknowledge the first MAC data unit; transmitting, by the first WLAN communication device, the second MAC data unit to the second WLAN communication device via a second WLAN communication channel having a second RF bandwidth that does not overlap the first RF bandwidth.

Embodiment 14. The method of embodiment 13, wherein: receiving the first MAC data unit comprises receiving, at a first RF radio of a plurality of RF radios of the first WLAN communication device and from the second WLAN communication device via the first WLAN communication channel, a first RF signal that corresponds to the first MAC data unit and occupies the first RF bandwidth, generating, by one or more baseband signal processors implemented on one or more integrated circuit (IC) devices of the first WLAN communication device, a first baseband signal that corresponds to the first MAC data unit, and generating, by the one or more baseband signal processors, the first MAC data unit using the first baseband signal; generating the second MAC data unit comprises providing, by a single MAC layer processor implemented on the one or more IC devices, the second MAC data unit to the one or more baseband signal processors, and generating, at the one or more baseband signal processors, a second baseband signal that corresponds to the second MAC data unit; transmitting the second MAC data unit comprises transmitting, by a second RF radio of the plurality of RF radios and to the second WLAN communication device via the second WLAN communication channel, a second RF signal that corresponds to the second baseband signal and occupies the second RF bandwidth.

Embodiment 15. The method of embodiment 14, further comprising: providing, by the single MAC layer processor, a third MAC data unit to the one or more baseband signal processors; generating, at the one or more baseband signal processors, a third baseband signal that corresponds to the third MAC data unit; transmitting, by the second RF radio and to the second WLAN communication device via the first WLAN communication channel, a third RF signal that corresponds to the third baseband signal; wherein the second RF radio transmits at least a portion of the third RF signal simultaneously with reception by the first RF radio of at least a portion of the first RF signal.

Embodiment 16. The method of embodiment 14, wherein the first WLAN communication channel includes a primary channel, the method further including:

providing, by the single MAC layer processor, a third MAC data unit to the one or more baseband signal processors; generating, at the one or more baseband signal processors, a third baseband signal that corresponds to the third MAC data unit; transmitting, by the first RF radio and to a legacy WLAN communication device via the first WLAN communication channel, a third RF signal that corresponds to the third baseband signal; receiving, at the first RF radio and from the legacy WLAN communication device via the first WLAN communication channel, a fourth RF signal that corresponds to an acknowledgment of the third MAC data unit; generating, by the one or more baseband signal processors, a fourth baseband signal that corresponds to the acknowledgment of the third MAC data unit; generating, by the one or more baseband signal processors, a fourth MAC data unit that corresponds to the acknowledgment of the third MAC data unit.

Embodiment 17. The method of embodiment 13, wherein: the first RF bandwidth and first WLAN communication channel are designated for MAC data units that include forward traffic; the second RF bandwidth and the second WLAN communication channel are designated for MAC data units that include reverse traffic that acknowledges the forward traffic.

Embodiment 18. The method of embodiment 17, wherein: the forward traffic includes multi-user, multiple input multiple output (MU-MIMO) forward traffic transmitted to a plurality of WLAN communication device that includes the second WLAN communication devices; and the reverse traffic is triggered by a trigger MAC data unit transmitted via the second WLAN communication channel to the plurality of WLAN communication devices.

Embodiment 19. The method of embodiment 17, wherein: the forward traffic includes orthogonal frequency division multiple access (OFDMA) forward traffic to a plurality of WLAN communication devices that includes the second WLAN communication device; and the reverse traffic is triggered by a trigger MAC data unit transmitted via the second WLAN communication channel to the plurality of WLAN communication devices.

Embodiment 20. The method of embodiment 14, wherein: the first RF bandwidth and first WLAN communication channel are designated for MAC data units that include downlink traffic transmitted to the first WLAN communication device, wherein the first WLAN communication device is a WLAN client station; the second RF bandwidth and the second WLAN communication channel are designated for MAC data units that include uplink traffic transmitted from the WLAN client station.

Embodiment 21. The method of embodiment 20, wherein: the downlink traffic includes MU-MIMO traffic to a plurality of WLAN communication devices that includes the first WLAN communication device; and the uplink traffic is triggered by a trigger MAC data unit transmitted via the second WLAN communication channel to the plurality of WLAN communication devices.

Embodiment 22. The method of embodiment 20, wherein: the downlink traffic includes OFDMA data units transmitted to a plurality of WLAN communication devices that includes the first WLAN communication device; and the uplink traffic includes OFDMA data units that are transmitted by the plurality of WLAN communication devices and triggered by a trigger MAC data unit transmitted via the second WLAN communication channel to the plurality of WLAN communication devices.

Embodiment 23. The method of embodiment 13, wherein the first and second RF bandwidths have different respective bandwidths and one of the first and second RF bandwidths is larger than another of the first and second RF bandwidths.

Embodiment 24. The method of embodiment 13, wherein the first RF bandwidth and the second RF bandwidth are separated by at least 160 MHz.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for duplex communication in a wireless local area network (WLAN), the method comprising:
   generating, at an access point (AP) of the WLAN, a plurality of first media access control (MAC) data units intended for a plurality of client stations of the WLAN;
   transmitting, by the AP, a multi-user first downlink (DL) transmission to the plurality of client stations via a first WLAN communication channel having a first radio frequency (RF) bandwidth, the multi-user first DL transmission including the plurality of first MAC data units;
   generating, at the AP, a second MAC data unit having a trigger frame configured to prompt an uplink (UL) multi-user transmission by the plurality of client stations;
   transmitting, by the AP, a second DL transmission to the plurality of client stations via a second WLAN communication channel having a second RF bandwidth that does not overlap the first RF bandwidth, the second DL transmission including the second MAC data unit; and
receiving, at the AP, the UL multi-user transmission from the plurality of client stations via the second WLAN communication channel, the UL multi-user transmission including simultaneous transmissions from the plurality of client stations within the second WLAN communication channel that overlap in time with the multi-user first DL transmission via the first WLAN communication channel.

2. The method of claim 1, wherein receiving the UL multi-user transmission comprises:
receiving, within the UL multi-user transmission, respective acknowledgments from the plurality of client stations, the respective acknowledgments acknowledging data traffic transmitted by the AP in the first RF bandwidth.

3. The method of claim 1, wherein:
generating the plurality of first MAC data units comprises generating the plurality of first MAC data units at a single MAC layer processor implemented on one or more integrated circuit (IC) devices of the AP;
generating the second MAC data unit comprises generating the second MAC data unit at the single MAC layer processor;
the method further comprises:
providing, by the single MAC layer processor, the plurality of first MAC data units to a first baseband signal processor implemented on the one or more IC devices,
generating, at the first baseband signal processor, a first baseband signal that corresponds to the multi-user first DL transmission,
providing, by the single MAC layer processor, the second MAC data unit to a second baseband signal processor implemented on the one or more IC devices, and
generating, at the second baseband signal processor, a second baseband signal that corresponds to the second DL transmission;
transmitting the multi-user first DL transmission comprises transmitting the multi-user first DL transmission by a first RF radio coupled to the first baseband signal processor;
transmitting the second DL transmission comprises transmitting the second DL transmission by a second RF radio coupled to the second baseband signal processor; and
receiving the UL multi-user transmission comprises receiving the UL multi-user transmission at the second RF radio.

4. The method of claim 1, wherein:
transmitting the multi-user first DL transmission comprises transmitting the multi-user first DL transmission via at least a first primary channel of the first WLAN communication channel;
transmitting the second DL transmission comprises transmitting the second DL transmission via at least a second primary channel of the second WLAN communication channel; and
receiving the UL multi-user transmission comprises receiving the UL multi-user transmission via at least the second primary channel of the second WLAN communication channel.

5. The method of claim 1, wherein:
transmitting the multi-user first DL transmission comprises transmitting a DL multi-user, multiple input multiple output (MU-MIMO) transmission to the plurality of client stations; and
receiving the UL multi-user transmission comprises receiving an UL MU-MIMO transmission from the plurality of client stations.

6. The method of claim 1, wherein:
transmitting the multi-user first DL transmission comprises transmitting a DL orthogonal frequency division multiple access (OFDMA) transmission to the plurality of client stations; and
receiving the UL multi-user transmission comprises receiving an UL OFDMA transmission from the plurality of client stations.

7. The method of claim 1, wherein one of the first RF bandwidth and the second RF bandwidth has a first frequency bandwidth that is larger than a second frequency bandwidth of another one of the first RF bandwidth and the second RF bandwidth.

8. The method of claim 1, wherein the first RF bandwidth and the second RF bandwidth are separated by a gap in frequency.

9. An access point configured to operate in a wireless local area network (WLAN), the access point comprising:
a wireless network interface device comprising: one or more integrated circuit (IC) devices, a first radio frequency (RF) radio implemented at least partially on the one or more IC devices, and a second RF radio implemented at least partially on the one or more IC devices;
wherein the one or more IC devices are configured to:
generate a plurality of first media access control (MAC) data units intended for a plurality of client stations of the WLAN,
control the first RF radio to transmit a multi-user first downlink (DL) transmission to the plurality of client stations via a first WLAN communication channel having a first radio frequency (RF) bandwidth, the multi-user first DL transmission including the plurality of first MAC data units,
generate a second MAC data unit having a trigger frame configured to prompt an uplink (UL) multi-user transmission by the plurality of client stations,
control the second RF radio to transmit a second DL transmission to the plurality of client stations via a second WLAN communication channel having a second RF bandwidth that does not overlap the first RF bandwidth, the second DL transmission including the second MAC data unit, and
receive the UL multi-user transmission from the plurality of client stations via the second WLAN communication channel and the second RF radio, the UL multi-user transmission including simultaneous transmissions from the plurality of client stations within the second WLAN communication channel that overlap in time with the multi-user first DL transmission via the first WLAN communication channel.

10. The access point of claim 9, wherein the one or more IC devices are further configured to:
receive, within the UL multi-user transmission, respective acknowledgments from the plurality of client stations, the respective acknowledgments acknowledging data traffic transmitted by the AP in the first RF bandwidth.

11. The access point of claim 9, wherein the wireless network interface device further comprises:
a single MAC layer processor implemented on the one or more IC devices, the single MAC layer processor configured to generate the plurality of first MAC data units and the second MAC data unit;

a first baseband signal processor implemented on the one or more IC devices, the first baseband signal processor configured to receive the plurality of first MAC data units from the single MAC layer processor and generate a first baseband signal that includes the plurality of first MAC data units, the first baseband signal corresponding to the multi-user first DL transmission; and a second baseband signal processor implemented on the one or more IC devices, the second baseband signal processor configured to receive the second MAC data unit from the single MAC layer processor and generate a second baseband signal that includes the second MAC data unit, the second baseband signal corresponding to the second DL transmission.

12. The access point of claim 9, wherein the one or more IC devices are further configured to:

control the first RF radio to transmit the multi-user first DL transmission via at least a first primary channel of the first WLAN communication channel;

control the second RF radio to transmit the second DL transmission via at least a second primary channel of the second WLAN communication channel; and receive the UL multi-user transmission via at least the second primary channel of the second WLAN communication channel.

13. A method for duplex communication in a wireless local area network (WLAN), the method comprising:

receiving, at a first client station in the WLAN, a multi-user first downlink (DL) transmission from an access point (AP) via a first WLAN communication channel having a first radio frequency (RF) bandwidth, the multi-user first DL transmission including at least i) a first media access control (MAC) data unit intended for the first client station, and ii) one or more second MAC data units intended for one or more respective second client stations in the WLAN;

receiving, at the first client station, a second DL transmission from the AP via a second WLAN communication channel having a second RF bandwidth that does not overlap the first RF bandwidth, the second DL transmission including a third MAC data unit having a trigger frame configured to prompt an uplink (UL) multi-user transmission by a plurality of client stations that includes the first client station;

generating, at the first client station, a fourth MAC data unit intended for the AP; and in response to the trigger frame, transmitting, by the first client station, the fourth MAC data unit as part of the UL multi-user transmission from the plurality of client stations via the second WLAN communication channel, the UL multi-user transmission including simultaneous transmissions from the plurality of client stations within the second WLAN communication channel that overlap in time with the multi-user first DL transmission via the first WLAN communication channel.

14. The method of claim 13, wherein generating the fourth MAC data comprises:

generating an acknowledgment of data traffic received from the AP via the first RF bandwidth.

15. The method of claim 13, further comprising:

processing, at a first baseband signal processor of the first client station, a first baseband signal corresponding to multi-user first DL transmission received via the first RF bandwidth;

providing, by the first baseband signal processor, first MAC layer information in the first baseband signal to a single MAC layer processor of the first client station;

processing, at a second baseband signal processor of the first client station, a second baseband signal corresponding to the trigger frame in the second DL transmission received via the second RF bandwidth;

providing, by the second baseband signal processor, second MAC Layer information in the second baseband signal to the single MAC layer processor;

generating, at the single MAC layer processor, the fourth MAC data unit;

providing, by the single MAC layer processor, the fourth MAC data unit to the second baseband signal processor; and generating, at the second baseband signal processor, a third baseband signal corresponding to the UL multi-user transmission.

16. The method of claim 13, wherein:

receiving the multi-user first DL transmission comprises receiving the multi-user first DL transmission via at least a first primary channel of the first WLAN communication channel;

receiving the second DL transmission comprises receiving the second DL transmission via at least a second primary channel of the second WLAN communication channel; and transmitting the fourth MAC data unit as part of the UL multi-user transmission comprises transmitting the fourth MAC data unit via at least the second primary channel of the second WLAN communication channel as part of the UL multi-user transmission.

17. The method of claim 13, wherein:

receiving the multi-user first DL transmission comprises receiving a DL multi-user, multiple input multiple output (MU-MIMO) transmission; and transmitting the fourth MAC data unit as part of the UL multi-user transmission comprises transmitting the fourth MAC data unit as part of an UL MU-MIMO transmission.

18. The method of claim 13, wherein:

receiving the multi-user first DL transmission comprises receiving a DL orthogonal frequency division multiple access (OFDMA) transmission; and transmitting the fourth MAC data unit as part of the UL multi-user transmission comprises transmitting the fourth MAC data unit as part of an UL OFDMA transmission.

19. The method of claim 13, wherein one of the first RF bandwidth and the second RF bandwidth has a first frequency bandwidth that is larger than a second frequency bandwidth of another one of the first RF bandwidth and the second RF bandwidth.

20. The method of claim 13, wherein the first RF bandwidth and the second RF bandwidth are separated by a gap in frequency.

21. A first client station configured to operate in a wireless local area network (WLAN), the client station comprising:

a wireless network interface device comprising: one or more integrated circuit (IC) devices, a first radio frequency (RF) radio implemented at least partially on the one or more IC devices, and a second RF radio implemented at least partially on the one or more IC devices;

wherein the one or more IC devices are configured to:

receive a multi-user first downlink (DL) transmission from an access point (AP) via a first WLAN communication channel having a first RF bandwidth and via the first RF radio, the multi-user first DL transmission including at least i) a first MAC data unit intended for the first client station, and ii) one or more second MAC data units intended for one or more respective second client stations in the WLAN, receive, via the second RF radio, a second DL transmission from the AP via a second WLAN communication channel having a second RF bandwidth that does not overlap the first RF bandwidth, the second DL transmission including a third MAC data unit having a trigger frame configured to prompt an uplink (UL) multi-user transmission by a plurality of client stations that includes the first client station, generate a fourth MAC data unit intended for the AP, and in response to the trigger frame, control the second RF radio to transmit the fourth MAC data unit as part of the UL multi-user transmission from the plurality of client stations via the second WLAN communication channel, the UL multi-user transmission including simultaneous transmissions from the plurality of client stations within the second WLAN communication channel that overlap in time with the multi-user first DL transmission via the first WLAN communication channel.

22. The first client station of claim 21, wherein generating the fourth MAC data comprises:

generating an acknowledgment of data traffic received from the AP via the first RF bandwidth.

23. The first client station of claim 21, wherein the wireless network interface device further comprises:

a single MAC layer processor implemented on the one or more IC devices, the single MAC layer processor configured to generate the fourth MAC data unit;

a first baseband signal processor implemented on the one or more IC devices, the first baseband signal processor configured to:

process a first baseband signal corresponding to the multi-user first DL transmission received via the first RF bandwidth, and provide first MAC layer information in the first baseband signal to a single MAC layer processor of the first client station; and a second baseband signal processor implemented on the one or more IC devices, the second baseband signal processor configured to:

process a second baseband signal corresponding to the trigger frame in the second DL transmission received via the second RF bandwidth, provide second MAC Layer information in the second baseband signal to the single MAC layer processor, receive the fourth MAC data unit from the single MAC layer processor, and generate a third baseband signal that includes the fourth MAC data unit, the third baseband signal corresponding to the UL multi-user transmission.

* * * * *